(12) United States Patent
Mori et al.

(10) Patent No.: US 7,604,263 B2
(45) Date of Patent: Oct. 20, 2009

(54) PIPE JOINT CONSTRUCTION

(75) Inventors: Mitsuhiro Mori, Sanda (JP); Fumiyoshi Miyazaki, Toride (JP)

(73) Assignees: Tokyo Metropolitan Government, Tokyo (JP); Taisei Kiko Co., Ltd., Osaka (JP)

( * ) Notice: Subject to any disclaimer, the term of this patent is extended or adjusted under 35 U.S.C. 154(b) by 328 days.

(21) Appl. No.: 10/582,809

(22) PCT Filed: Dec. 15, 2004

(86) PCT No.: PCT/JP2004/018712

§ 371 (c)(1),
(2), (4) Date: Jun. 14, 2006

(87) PCT Pub. No.: WO2005/059425

PCT Pub. Date: Jun. 30, 2005

(65) Prior Publication Data

US 2007/0158944 A1  Jul. 12, 2007

(30) Foreign Application Priority Data

Dec. 17, 2003  (JP) .............................. 2003-419314

(51) Int. Cl.
*F16L 19/04* (2006.01)
*F16L 21/03* (2006.01)

(52) U.S. Cl. .................. 285/376; 285/377; 285/360; 285/362; 285/87

(58) Field of Classification Search .......... 285/376, 285/377, 360, 362, 388, 87, 361, 403
See application file for complete search history.

(56) References Cited

U.S. PATENT DOCUMENTS

| 2,376,566 | A | * | 5/1945 | Woodling | .................... 220/298 |
| 2,778,662 | A | * | 1/1957 | Smith | .......................... 285/343 |
| 3,709,526 | A | | 1/1973 | Cromie | |
| 4,540,204 | A | | 9/1985 | Battle et al. | |
| 7,207,606 | B2 | * | 4/2007 | Owen et al. | .................. 285/339 |

FOREIGN PATENT DOCUMENTS

| CH | 405839 | 1/1966 |
| GB | 1070359 | 6/1967 |
| JP | 916503 | 12/1934 |

(Continued)

*Primary Examiner*—James M Hewitt
(74) *Attorney, Agent, or Firm*—The Webb Law Firm

(57) ABSTRACT

A pipe joint construction comprising an elastic seal member (4) for hermetically sealing between an inner circumferential surface of a receiving pipe section (1) and an outer circumferential surface of an inserted pipe section (2) inserted into and connected to the receiving pipe section in a pipe axis direction (X), and a lock member (7) provided in the inner circumferential surface of the receiving pipe section (1) adjacent a receiving opening thereof for preventing separation of the pipe sections by contacting an engaging projection (5) protruding from the outer circumferential surface of the inserted pipe section (2) in the pipe axis direction, wherein the construction further comprises an attachment/detachment control device (A) for attaching and detaching the lock member (7) to/from the receiving pipe section (1) by rotating the lock member (7) about the pipe axis direction (X) relative to the receiving pipe section (1) and by moving, in the pipe axis direction (X), the lock member (7) placed in a specific position in a passage of rotation.

8 Claims, 17 Drawing Sheets

FOREIGN PATENT DOCUMENTS

| | | |
|---|---|---|
| JP | 47-25710 | 10/1972 |
| JP | 5186821 U | 7/1976 |
| JP | 5554788 A | 4/1980 |
| JP | 55109809 | 8/1980 |
| JP | 56155188 | 11/1981 |
| JP | 475438 B2 | 11/1992 |
| JP | 9303636 | 11/1997 |

* cited by examiner

Fig. 3
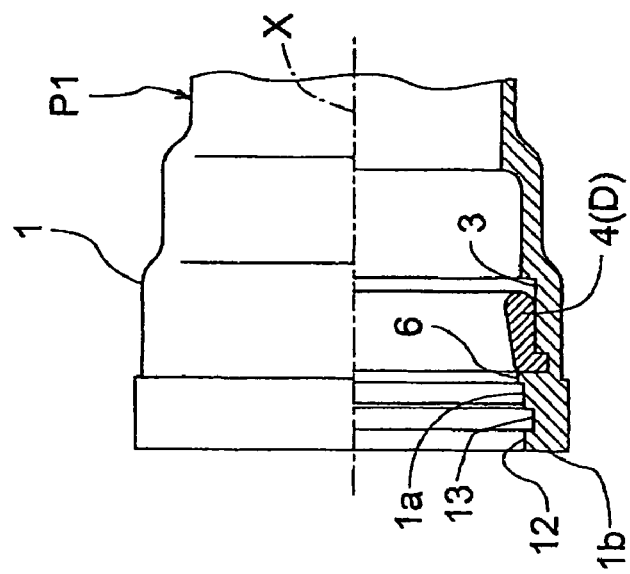
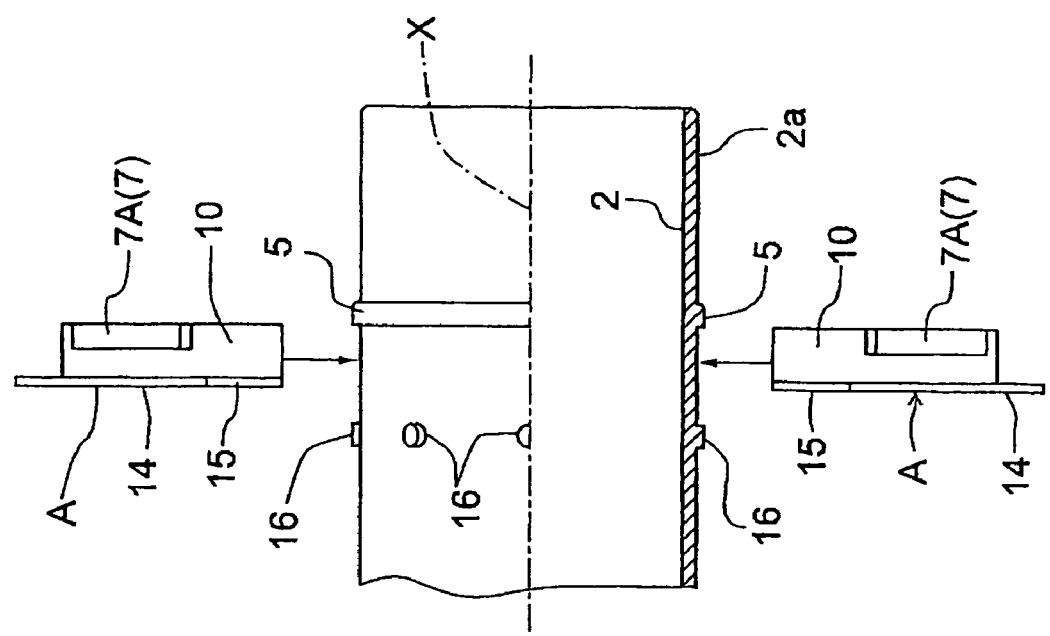

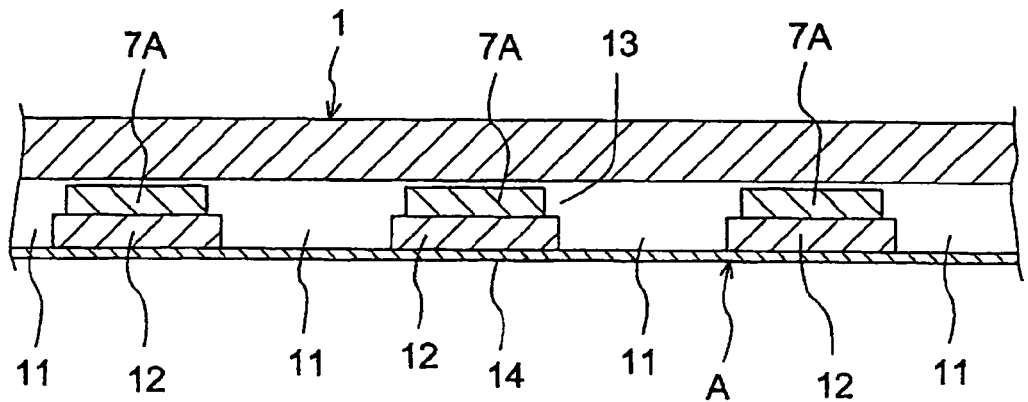
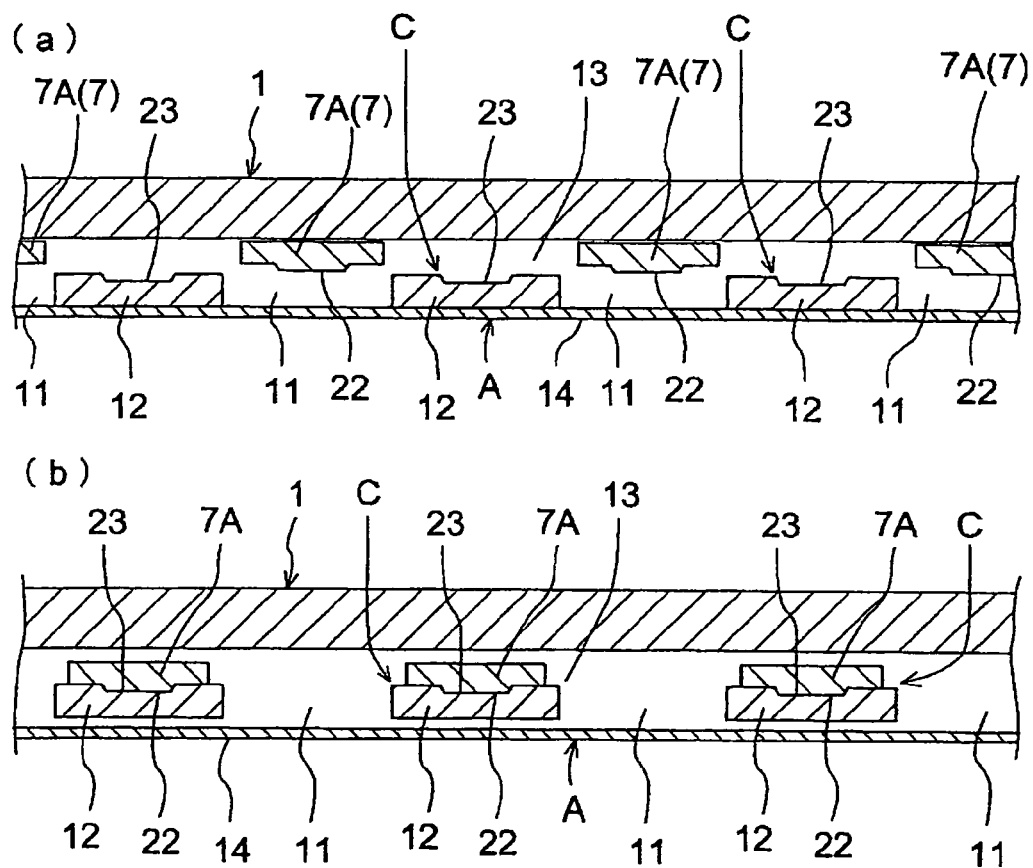

Fig. 23
(a)
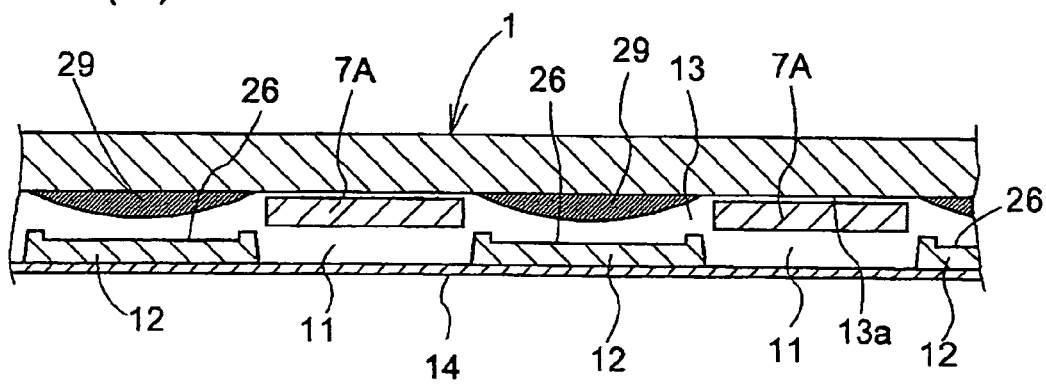
(b)
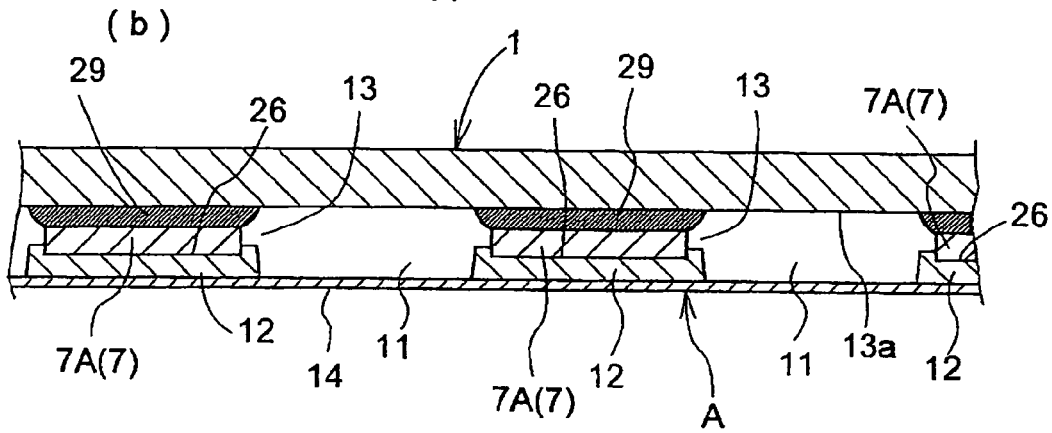
Fig. 24
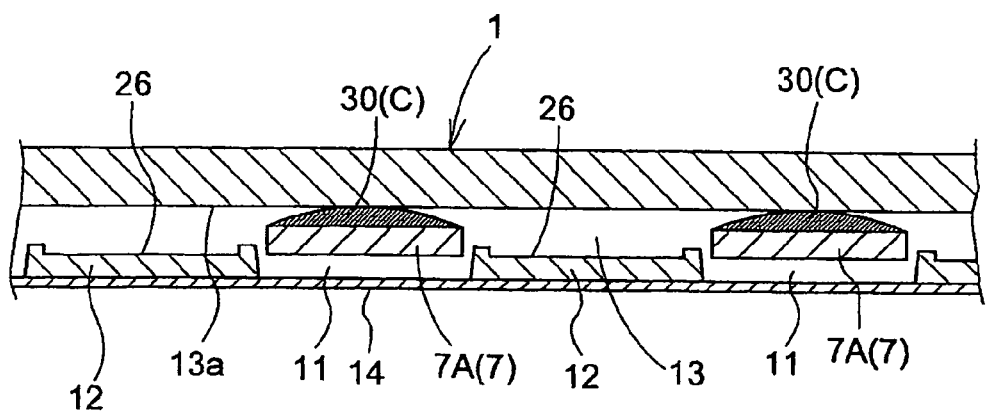

PRIOR ART

PIPE JOINT CONSTRUCTION

TECHNICAL FIELD

The present invention relates to a pipe joint construction provided in a pipeline system of fluid pipes. More particularly, the invention relates to a pipe joint construction comprising an elastic seal member for hermetically sealing between an inner circumferential surface of a receiving pipe section and an outer circumferential surface of an inserted pipe section inserted into and connected to the receiving pipe section in a pipe axis direction, and a lock member provided on the inner circumferential surface of the receiving pipe section adjacent a receiving opening thereof for preventing separation of the pipe sections by contacting an engaging projection protruding from the outer circumferential surface of the inserted pipe section in the pipe axis direction.

BACKGROUND ART

As shown in FIG. 25, a conventional pipe joint construction includes a first mounting groove 3 formed in an inner circumferential surface 1a of a receiving pipe section 1 for receiving an elastic seal member 4 to hermetically seal between the inner circumferential surface 1a of the receiving pipe section 1 and an outer circumferential surface 2a of an inserted pipe section 2, a stopper wall portion 6 formed at a portion close to an receiving opening from the mounting groove for limiting a maximum contracting position between the pipe sections 1 and 2 by contacting an annular engaging projection 5 protruding from the outer circumferential surface 2a of the inserted pipe section 2 in a pipe axis direction X, a second mounting groove 51 for receiving a substantially C-shaped lock member 50 elastically deformable in a diameter-increasing direction, and cum faces 52 and 53 formed on corners, opposing to each other in the pipe axis direction X, of the engaging projection 5 of the inserted pipe section 2 and the lock member 50 attached to the second mounting groove 51 for elastically deforming the lock member 50 in the diameter-increasing direction to the point of defining an inner diameter allowing passage of the inserted pipe section 2 as it is inserted into the receiving pipe section 1. (see Japanese unexamined patent publication "Kokai" No. 9-303636)

DISCLOSURE OF THE INVENTION

Problem to be Solved by the Invention

In the conventional pipe joint construction noted above, the lock member 50 mounted in the second mounting groove 51 in advance can be deformed by simply inserting the inserted pipe section 2 into the receiving pipe section 1 to increase the inner diameter for allowing passage of the engaging projection 5 as the inserting operation proceeds. As a result, a desired separation preventive function can be performed by contact between the lock member 50 on the side of the receiving pipe section 1 and the engaging projection 5 on the side of the inserted pipe section 2, and at the same time the assembling operation can be simplified. On the other hand, when a necessity arises to disassemble the pipe sections 1 and 2 for maintenance and inspection or for changing of parts, the lock member 50 has to be expanded against the elastic force to the extent of establishing a state for allowing the engaging projection 5 of the inserted pipe section 2 to pass through an annular space between the inner circumferential surface 1a of the receiving pipe section 1 and the outer circumferential surface 2a of the inserted pipe section 2, which involves a great deal of labor and effort in the disassembling operation.

The present invention has been made having regard to the above state of the art, and its primary object is to provide a pipe joint construction for reliably performing a desired separation preventive function by contact between the lock member of the receiving pipe section and the engaging projection of the inserted pipe section, and concurrently allowing the pipe sections to be assembled and disassembled efficiently and readily with reduced labor.

Means for Solving the Problem

A first characteristic feature of the present invention lies in a pipe joint construction comprising an elastic seal member for hermetically sealing between an inner circumferential surface of a receiving pipe section and an outer circumferential surface of an inserted pipe section inserted into and connected to the receiving pipe section in a pipe axis direction, and a lock member provided in the inner circumferential surface of the receiving pipe section adjacent a receiving opening thereof for preventing separating movement of the pipe sections by contacting an engaging projection protruding from the outer circumferential surface of the inserted pipe section in the pipe axis direction, wherein the construction further comprises an attachment/detachment control device for attaching and detaching the lock member to/from the receiving pipe section by rotating the lock member about the pipe axis direction relative to the receiving pipe section and by moving, in the pipe axis direction, the lock member placed in a specific position in a passage of rotation.

With the above-noted construction, in disassembling the two pipe sections, the lock member is rotated about the pipe axis direction relative to the receiving pipe section by the attachment/detachment control device so that a specific phase is established in which the receiving pipe section and the lock member are relatively movable in the pipe axis direction, and then the lock member is moved in the pipe axis direction in the specific position in the rotating operation passage defining the specific phase, thereby to remove the lock member from the receiving pipe section. Subsequently, it is sufficient to separate the pipe sections in the pipe axis direction.

On the other hand, in connecting the pipe sections to each other, the inserted pipe section is inserted into the receiving pipe section in the pipe axis direction, and then the lock member is moved in the pipe axis direction relative to the receiving pipe section in the specific position in the rotating operation passage defining the specific phase. Subsequently, the lock member is rotated along the rotating operation passage thereby to place the lock member in the predetermined attachment position. In this state, when an external force is exerted on the pipe sections in a pulling direction due to an earthquake or uneven settlement, for example, the engaging projection protruding from the outer circumferential surface of the inserted pipe section collides with the split lock pieces in the pipe axis direction. However, the shock applied to each split lock piece is reliably received by the receiving pipe section, thereby to firmly prevent separation of the pipe sections.

It is therefore possible to reliably perform a desired separation preventive function by contact between the lock member of the receiving pipe section and the engaging projection of the inserted pipe section, and to allow the pipe sections to be assembled and disassembled efficiently and readily with reduced labor.

A second characteristic feature of the pipe joint construction according to the present invention lies in further comprising a stopper wall portion formed in the inner circumferential surface of the receiving pipe section at a portion close to the receiving opening from a seal mounting groove for receiving the elastic seal member to contact an engaging projection protruding from the outer circumferential surface of the inserted pipe section in the pipe axis direction, thereby to limit a maximum contracting position between the pipe sections.

With the above-noted construction, when an external force is exerted on the pipe sections in the pulling direction due to an earthquake or uneven settlement, for example, the engaging projection protruding from the outer circumferential surface of the inserted pipe section collides with the stopper wall portion of the receiving pipe section in the pipe axis direction. However, since the stopper wall portion is formed at the portion close to the receiving opening from the seal mounting groove for receiving the elastic seal member, the elastic seal member is not compressed by the engaging projection of the inserted pipe section. As a result, a compression ratio of the elastic member can be maintained at a constant value, which can improve durability.

A third characteristic feature of the pipe joint construction according to the present invention lies in that the attachment/detachment control device includes a plurality of circumferentially divided control members insertable and removable in the pipe axis direction through a space between the outer circumferential surface of the inserted pipe section and the inner circumferential surface of the receiving pipe section, and a plurality of circumferentially extending split lock pieces forming the lock member and dispersedly formed on the control members, and the receiving pipe section includes, formed adjacent a receiving opening end thereof, attachment/detachment recesses for allowing insertion and removal of the split lock pieces in the pipe axis direction, and retainer wall portions for contacting the split lock pieces in the pipe axis direction when the split lock pieces inserted through the attachment/detachment recesses are rotated about the pipe axis direction to a predetermined attachment position thereby to prevent disengaging movement of the lock pieces.

With the above-noted construction, in disassembling the pipe sections, the plurality of control members having the plurality of split lock pieces forming the lock member and dispersedly formed on the control members are rotated about the pipe axis direction relative to the receiving pipe section so that the split lock pieces may face the attachment/detachment recesses formed in the opening end portion of the receiving pipe section in the pipe axis direction. Subsequently, each control member is moved in the pipe axis direction in the position where the split lock pieces correspond to the attachment/detachment recesses, thereby to remove each control member having the split lock pieces from the receiving pipe section. Subsequently, the pipe sections may only be separated in the pipe axis direction.

In connecting the pipe sections to each other, the inserted pipe section is inserted into the receiving pipe section in the pipe axis direction, and then the split lock pieces of each control member are inserted into the receiving pipe section through the attachment/detachment recesses formed in the opening end portion of the receiving pipe section. Subsequently, the split lock pieces are rotated along the rotating operation passage thereby to place the split lock pieces of each control member in the predetermined attachment position. In this state, when an external force is exerted on both the pipe sections in the pulling direction due to an earthquake or uneven settlement, for example, the engaging projection protruding from the outer circumferential surface of the inserted pipe section collides with the split lock pieces of each control member in the pipe axis direction. However, the shock applied to each split lock piece is reliably received by the receiving pipe section as it is, thereby to firmly prevent separation of the pipe sections.

Thus, while a desired separation preventive function is reliably performed by contact between each of the split lock pieces on the side of the receiving pipe section and the engaging projection on the side of the inserted pipe section, the pipe sections can be assembled and disassembled readily and efficiently with reduced labor. Further, the control members having the split lock pieces are arranged between the pipe sections to be substantially coaxially therewith, and the split lock pieces also act as engaging portions, which can contribute to compactness and simplification of the attachment/detachment control device.

In the above-noted construction, as a fourth characteristic feature of the present invention, it is preferable that the split lock pieces are formed on outer circumferential surfaces of the control members as engaging portions larger than an inner diameter of the receiving opening of the receiving pipe section, since each split lock piece acts also as the engaging portion to contribute to compactness and simplification of the attachment/detachment control device.

A fifth characteristic feature of the pipe joint construction according to the present invention lies in that the control members include flange portions formed at outward end portions thereof for closing or substantially closing an annular space between the inner circumferential surface of the receiving pipe section and the outer circumferential surface of the inserted pipe section.

With the above-noted construction, it is possible to restrain foreign substances such as mud and water from entering from the attachment/detachment recesses of the receiving pipe section, and also possible to easily disassemble the pipe sections fitted and connected to each other without being hampered by such foreign substances. Moreover, the flange portions of the control members can be also used as control portions for moving the control members about the pipe axis direction and in circumferential directions.

A sixth characteristic feature of the pipe joint construction according to the present invention lies in that each control member has a control pinching portion formed on an outward end portion thereof.

With the above-noted construction, each control member insertable and removable in the pipe axis direction through the space between the outer circumferential surface of the inserted pipe section and the inner circumferential surface of the receiving pipe section is readily and easily operated through the control pinching portion formed on the control member.

A seventh characteristic feature of the pipe joint construction according to the present invention lies in that each control member includes a pair of semicylindrical elements to be fitted along the outer circumferential surface of the inserted pipe section.

With the above-noted construction, the assembling operation for the control member relative to the pipe sections can be effected readily and efficiently, compared with the control member having a cylindrical shape capable of being fitted on the inserted pipe section, for example.

An eighth characteristic feature of the pipe joint construction according to the present invention lies in that the control members and the split lock pieces have a circumferential width to pass through the attachment/detachment recesses in the receiving pipe section, and wherein space limiting members made of a synthetic resin are disposed between adjacent control members inserted into the receiving pipe section through the attachment/detachment recesses to have a circumferential width to pass through the attachment/detachment recesses in the receiving pipe section in the pipe axis direction.

With the above-noted construction, the space limiting member made of a synthetic resin and arranged between the adjacent control members can not only limit the circumferential mounting distance between the adjacent control members inserted into the receiving pipe section through the attachment/detachment recesses, but also realize a weight reduction and improve the operational efficiency of the pipe joint construction.

A ninth characteristic feature of the pipe joint construction according to the present invention lies in further comprising a return preventive device provided for receiving the split lock pieces in positions advanced on the removing side in the pipe axis direction in the rotating operation passage when the split lock pieces inserted into the receiving pipe section are rotated along the rotating operation passage, and for preventing or restraining a relative rotation of the split lock pieces in a receiving position toward the specific attachment/detachment operating position.

With the above-noted construction, when the split lock piece of each control member is inserted into the receiving pipe section through the attachment/detaching recess formed at the receiving opening side of the receiving pipe section, and then rotated along the rotating operation passage to the predetermined attachment position, the return preventive member can prevent or restrain a relative rotation of the split lock piece toward the attachment/detachment recess by receiving the split lock piece rotated to the predetermined attachment position at the position advanced on the removing side in the pipe axis direction of the rotating operation passage.

For this reason, the split lock piece of each control member cannot be rotated to the attachment/detachment operating position to face the attachment/detachment recess with the split lock piece of each control member being received by the receiving member.

It is therefore possible to reliably perform a desired separation preventive function by contact between the lock member of the receiving pipe section and the engaging projection of the inserted pipe section, and concurrently allowing the pipe sections to be assembled and disassembled efficiently and readily with reduced labor.

A tenth characteristic feature of the pipe joint construction according to the present invention lies in that the return preventive device includes recesses formed in the split lock pieces into which part of the receiving pipe section is relatively engageable in the pipe axis direction in the predetermined attachment position of the rotating operation passage.

With the above-noted construction, in forming the receiving device for engaging and maintaining the split lock piece of each control member in the predetermined attachment position as well, only a recess needs to be formed in the split lock piece into which part of the receiving pipe section is relatively engageable in the pipe axis direction. Thus, the construction can be simplified and the manufacturing cost reduced.

An eleventh characteristic feature of the pipe joint construction according to the present invention lies in further comprising an urging device provided for moving and urging the split lock pieces to the receiving position of the return preventive device.

With the above-noted construction, the split lock piece of each control member rotated to the predetermined attachment position in the rotating operation passage is urged and maintained in the receiving position of the receiving member, which can restrain the split lock piece of each control member placed in the receiving position from being moved toward the rotating operation passage even if an external force is applied. As a result, it is possible to constantly and reliably perform a desired separation preventive function by contact between the lock member of the receiving pipe section and the engaging projection of the inserted pipe section.

Other characteristic features as well as advantages and effects and functions derived from such characteristic features will be apparent from the following description to be taken with reference to the accompanying drawings.

BRIEF DESCRIPTION OF THE DRAWINGS

[FIG. 3] Side view, partly in section, showing a state before pipe sections are fitted and connected to each other.

[FIG. 9] Developed sectional view of the principal portion of the construction in which the split lock pieces are placed in the predetermined attachment position.

[FIG. 10] Views showing a pipe joint construction according to a second embodiment of the present invention, (a) being a developed sectional view of a principal portion of the construction in which split lock pieces are placed in a attachment/detachment operating position, and (b) being a developed sectional view of the principal portion of the construction in which the split lock pieces are in the predetermined attachment position.

[FIG. 23] (a) Developed sectional view of the principal portion of the construction in which the split lock pieces are placed in the attachment/detachment operating position, and (b) developed sectional view of the construction in which the split lock pieces are placed in the predetermined attachment position.

[FIG. 24] Developed sectional view of a principal portion of a pipe joint construction according to an eighth embodiment of the present invention in which split lock pieces are placed in an attachment/detachment operating position.

BEST MODE FOR CARRYING OUT THE INVENTION

Figure 1:
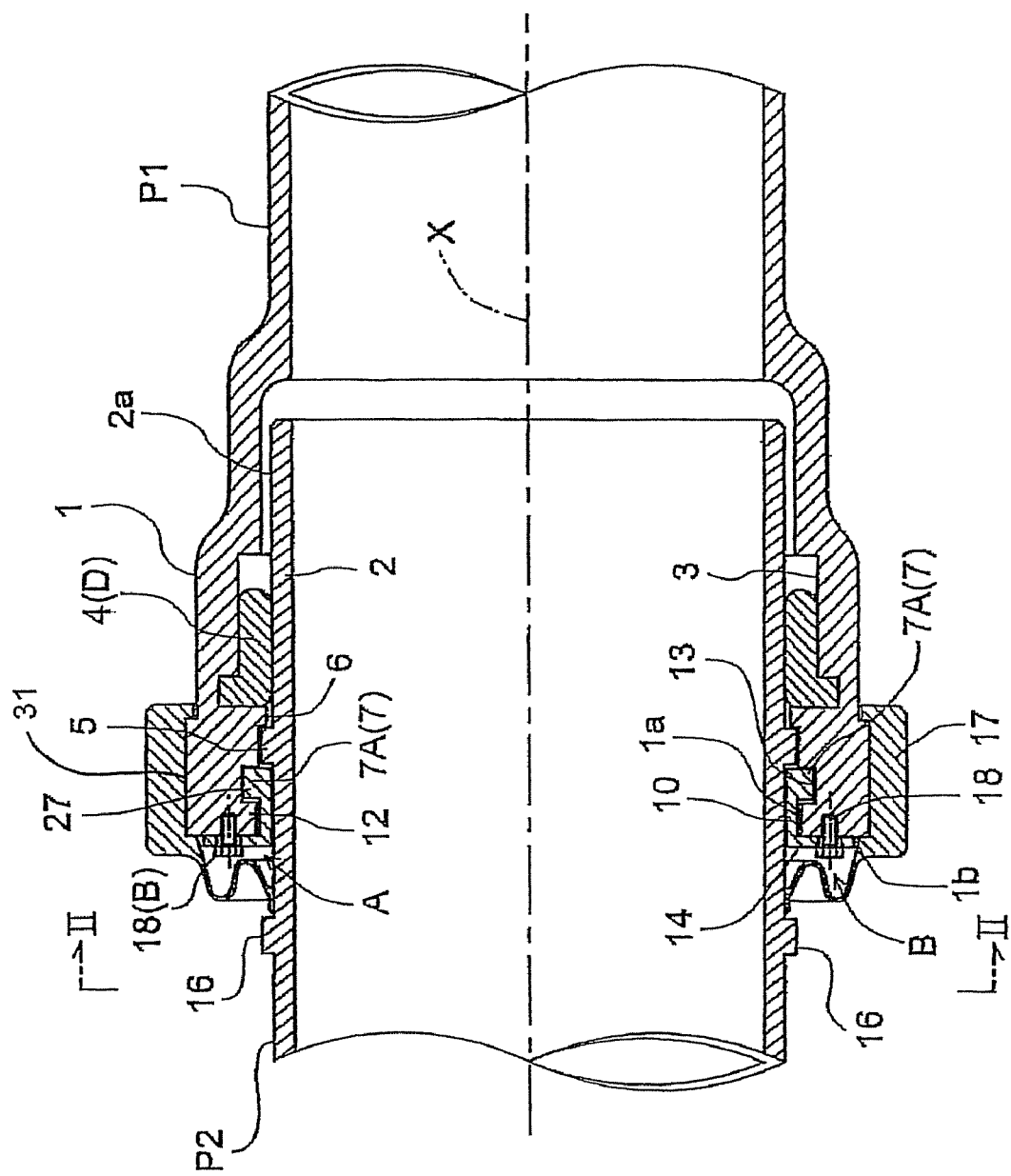
[FIG. 1] Sectional side view showing a first embodiment of a pipe joint construction according to the present invention.
Figure 2:
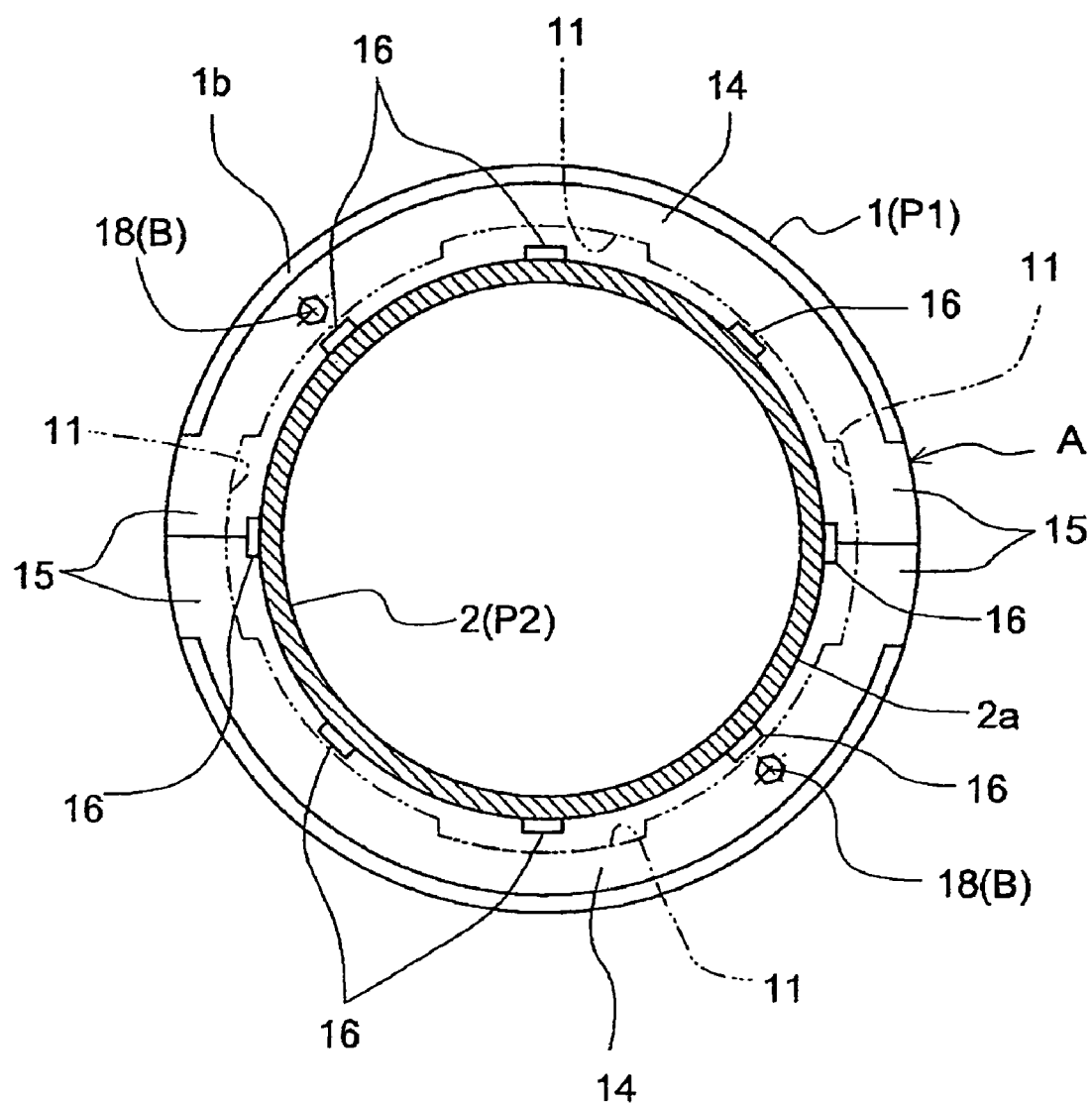
[FIG. 2] Sectional view taken on line II-II in FIG. 1.

Preferred embodiments of a pipe joint construction according to the present invention will be described hereinafter with reference to the accompanying drawings.

First Embodiment

FIGS. 1 through 9 show a pipe joint construction provided in a pipeline system of water pipes as one example of fluid pipes. The construction comprises a receiving pipe section 1 formed at one end of a cast-iron water pipe P1 of the straight tube type, an inserted pipe section 2 formed at one end of a cast-iron water pipe P2 of the straight tube type inserted into and connected to the receiving pipe section 1 in a direction of pipe axis X. The receiving pipe section 1 has an annular mounting groove 3 formed in an inner circumferential surface 1a thereof for receiving an elastic seal member 4 made of synthetic rubber to hermetically seal between the inner circumferential surface 1a of the receiving pipe section 1 and an outer circumferential surface 2a of the inserted pipe section 2. A stopper wall portion 6 is formed on the inner circumferential surface 1a of the receiving pipe section 1 at a portion close to a receiving opening from the seal mounting groove 3 for contacting, in the direction of pipe axis X, one side face of an annular engaging projection 5 protruding from and formed integrally with the outer circumferential surface 2a of the inserted pipe section 2, thereby to limit a maximum contracting position between the pipe sections 1 and 2. A cast-iron or steel lock member 7 is mounted on the inner circumferential surface 1a of the receiving pipe section 1 in the receiving opening side for contacting the other side face of the engaging projection 5 of the inserted pipe section 2 in the direction of pipe axis X, thereby to prevent separating movement between the pipe sections 1 and 2.

An attachment/detachment control device A is provided for attaching and detaching the lock member 7 to/from the receiving pipe section 2 by rotating the lock member 7 about the direction of pipe axis X relative to the receiving pipe section 1 and by moving the lock member in the direction of pipe axis X in a particular position (attachment/detachment operating position) in the passage of the rotating operation. A fixing device B is provided for removably fixing the lock member 7 placed in a predetermined attachment position to the receiving pipe section 1.

The attachment/detachment control device A includes control members 10 in the form of a pair of semicylindrical elements that is insertable and removable in the direction of pipe axis X through an annular space S (see FIG. 4) defined at the receiving opening side between the outer circumferential surface 2a of the inserted pipe section 2 and the inner circumferential surface 1a of the receiving pipe section 1, and capable of being fitted along the outer circumferential surface 2a of the inserted pipe section 2. The control member 10 has a plurality of split lock pieces 7A formed on a forward end portion thereof and dispersed circumferentially thereof with a predetermined number (two for each semicylindrical member in this embodiment) to constitute the lock member 7. The receiving pipe section 1 includes attachment/detachment recesses 11 formed in an open end portion 1b thereof for allowing the split lock pieces 7A placed in the attachment/detachment operating position (specific attachment/detachment position) to be inserted and removed in the direction of pipe axis X, and retainer wall portions 12 integrally formed with the end portion 1b thereof for contacting the split lock pieces 7A in the direction of pipe axis X thereby to prevent disengaging movement (removing movement) of the lock pieces when the split lock pieces 7A inserted through the attachment/detachment recesses 11 are rotated about the direction of pipe axis X to the specific attachment position.

The split lock pieces 7A are formed on the outer circumferential surface of each control member 10 at the inserting end portion in the direction of pipe axis X to act as engaging portions 27 larger than a receiving opening inner diameter 1a of the receiving pipe section 1.

The stopper wall portions 6 have an inner diameter smaller than an outer diameter of the engaging projection 5 of the inserted pipe potion 2, while the split lock pieces 7A of the control members 10 define an outer diameter larger than the inner diameter of the inner circumferential surface 1a at the receiving opening side of the receiving pipe section 1. A rotating operation guide groove 13 is formed in the inner circumferential surface 1a of the receiving opening of the receiving pipe section 1 slightly larger than the outer diameter of the engaging projection 5 of the inserted pipe section 2 for receiving the respective lock pieces 7A of the control members 10 thereby to guide rotational movement of the control members 10 about the direction of pipe axis X. The rotating operation guide groove 13 communicates in four circumferential positions thereof with the attachment/detachment recesses 11 in the direction of pipe axis X.

A semicircular flange portion 14 is formed integrally with an outward end portion in the direction of pipe axis X of the outer circumferential surface of each control member 10 to be capable of contacting the end face of the receiving opening side of the receiving pipe section 1 when each split lock piece 7A of the control member 10 is engaged into the guide groove 13, thereby to close or substantially close the annular space S defined between the inner circumferential surface 1a of the receiving pipe section 1 and the outer circumferential surface 2a of the inserted pipe section 2. Control pinching portions 15 are formed integrally with circumferentially opposite ends of each control member 10 to protrude radially outward therefrom in an operating direction for moving in the direction of pipe axis X and rotating about the direction of pipe axis X both of the split lock pieces 7A of each control member 10.

Each split lock piece 7A of the control members 10 has a circumferential width smaller than a circumferential width of each attachment/detachment recess 11 of the receiving pipe section 1, while each retainer wall portion 12 of the receiving pipe section 1 has a circumferential width larger than the circumferential width of each split lock piece 7A.

Figure 4:
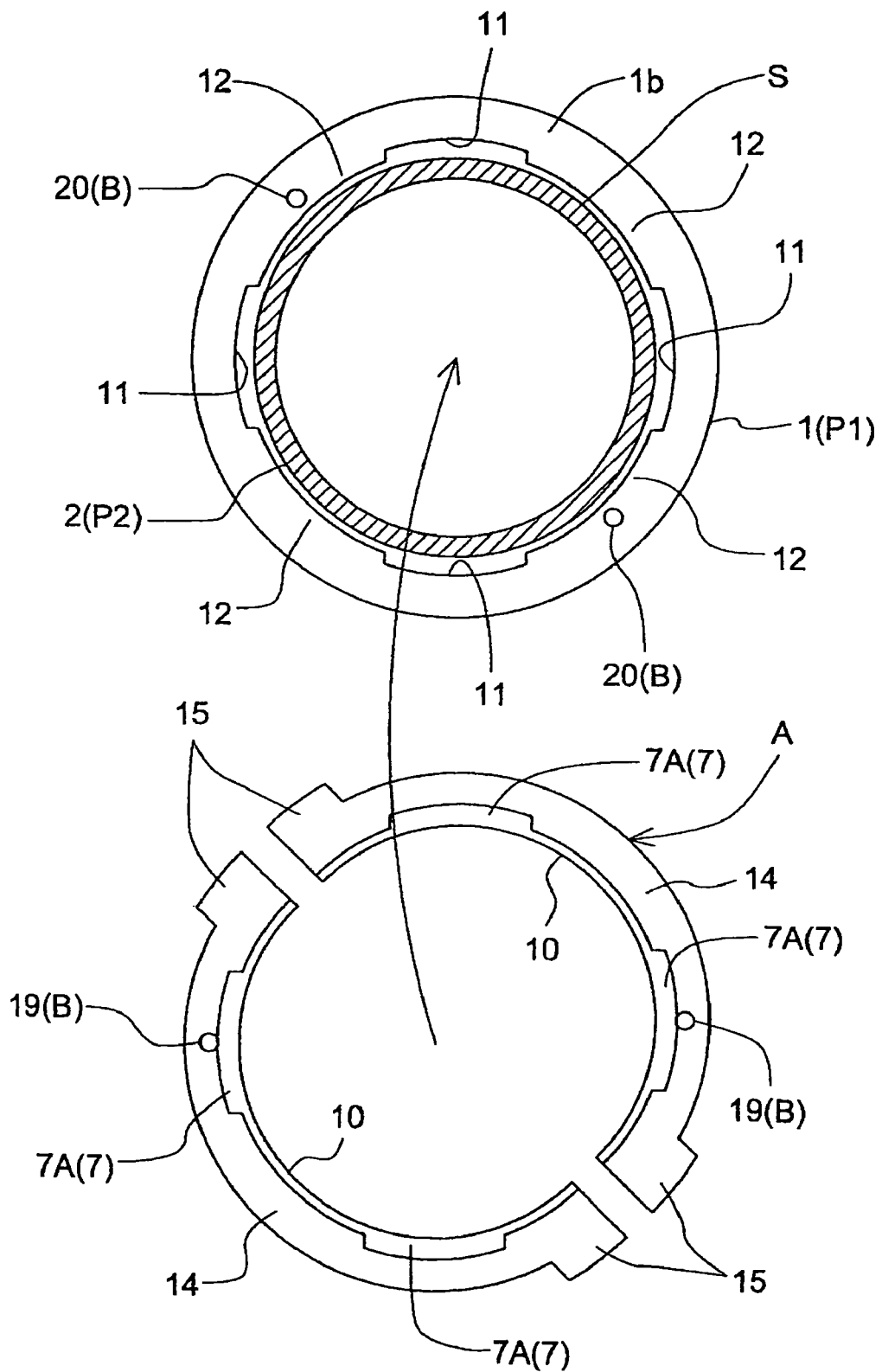
[FIG. 4] Sectional front view of a principal portion showing the state before the pipe sections are fitted and connected to each other.
Figure 5:
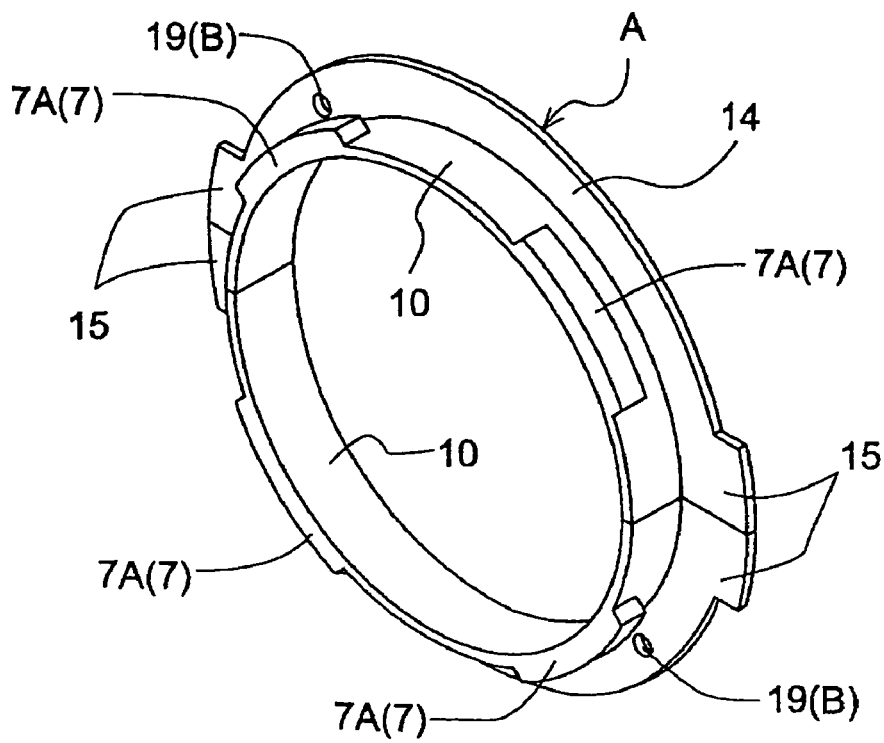
[FIG. 5] Perspective view of control members and flange portions forming an attachment/detachment control device.
Figure 6:
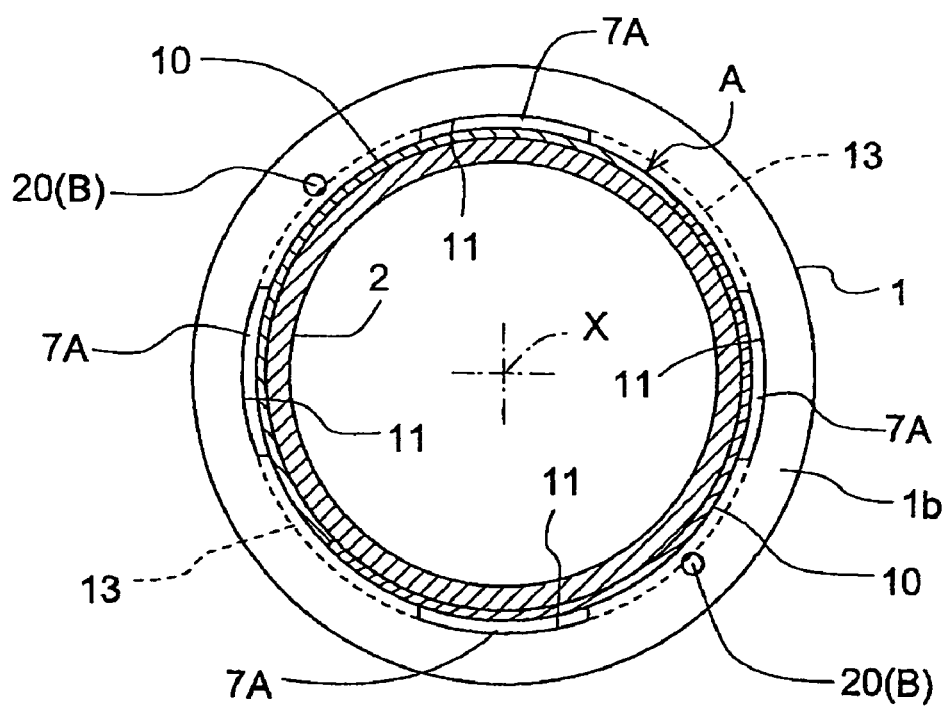
[FIG. 6] Sectional front view of a principal portion of the construction in which split lock pieces are placed in an attachment/detachment operating position.
Figure 7:
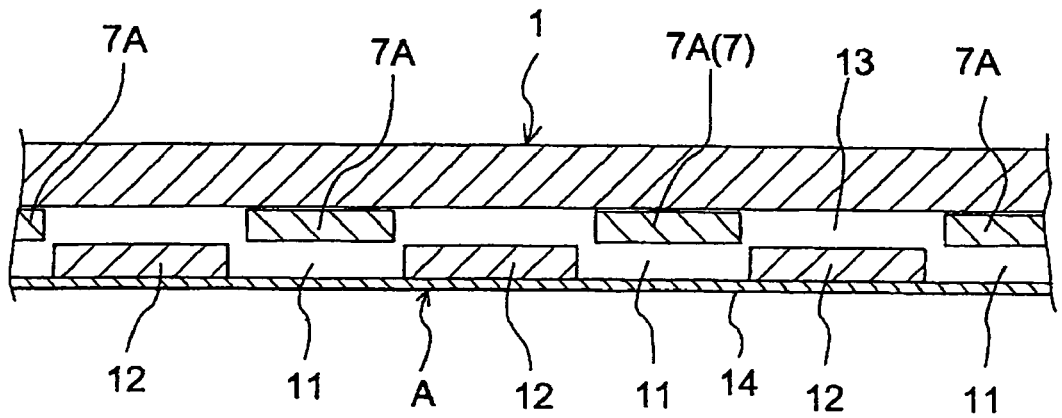
[FIG. 7] Developed sectional view of the principal portion of the construction in which the split lock pieces are placed in the attachment/detachment operating position.
Figure 8:
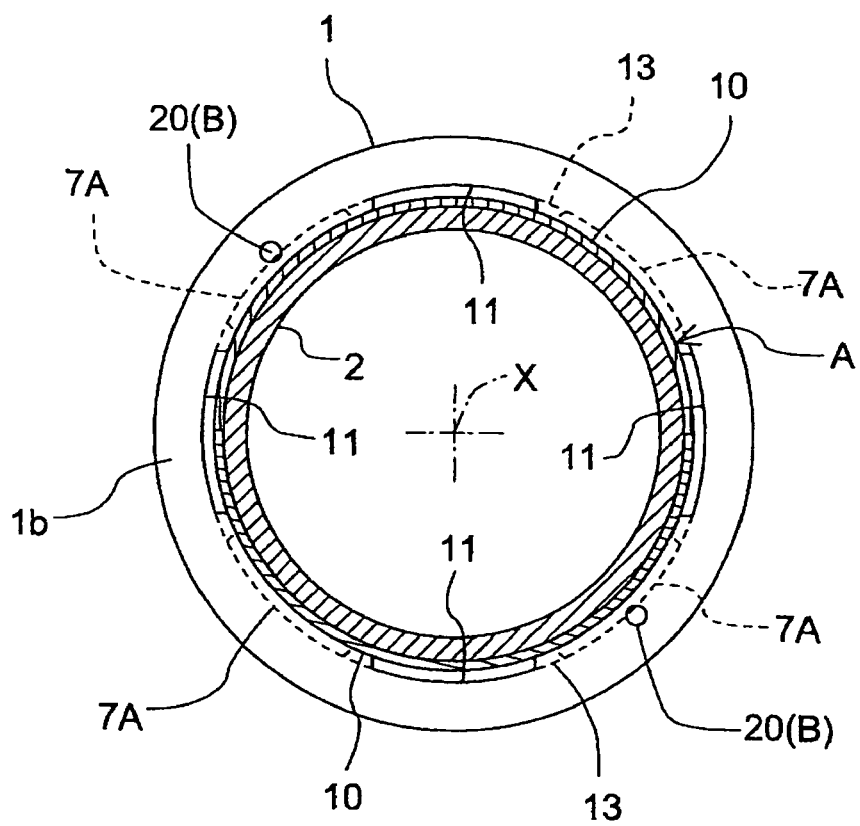
[FIG. 8] Sectional front view of the principal portion of the construction in which the split lock pieces are placed in a predetermined attachment position.
Figure 11:
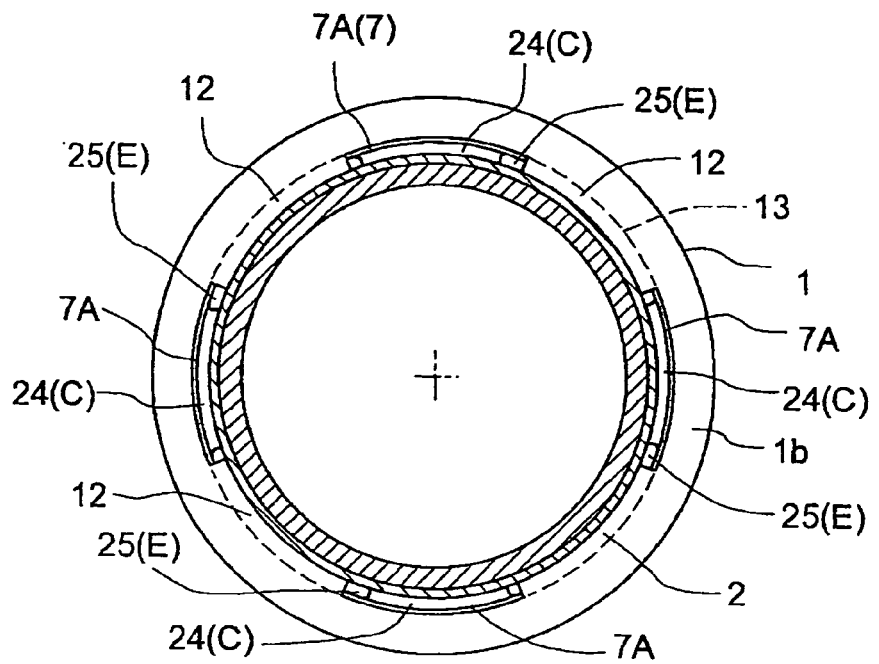
[FIG. 11] Sectional front view of a pipe joint construction according to a third embodiment of the present invention, showing a principal portion of the construction in which split lock pieces are placed in the attachment/detachment operating position.
Figure 12:
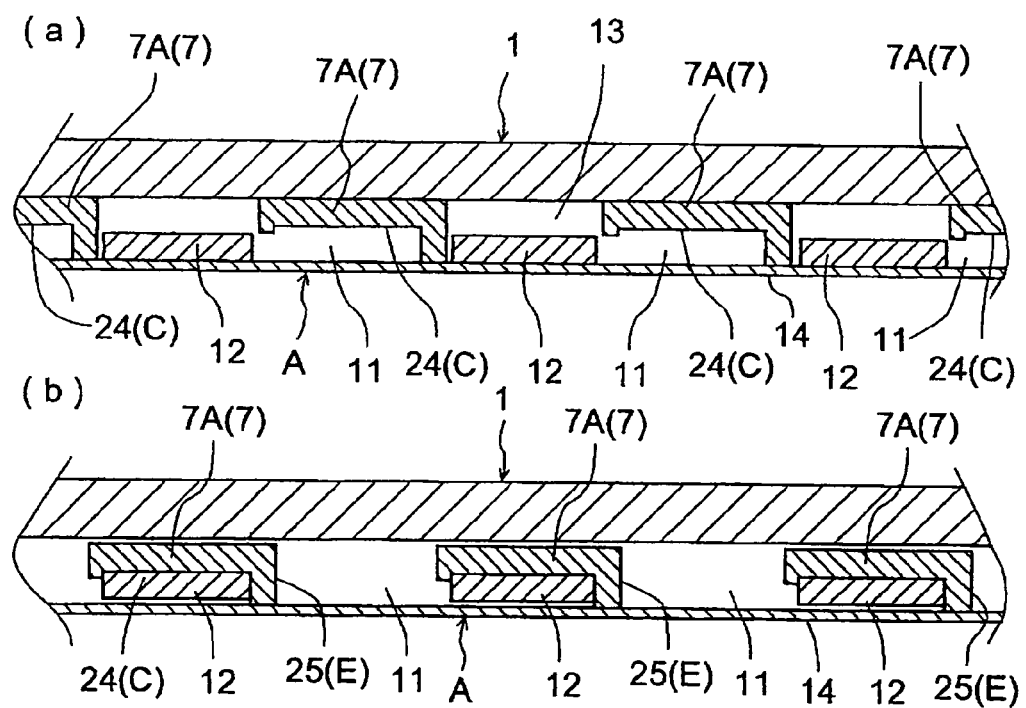
[FIG. 12] (a) Developed sectional view of the principal portion of the construction in which the split lock pieces are placed in the attachment/detachment operating position, and (b) developed sectional view showing the principal portion of the construction in which the split lock pieces are placed in the predetermined attachment position.
Figure 13:
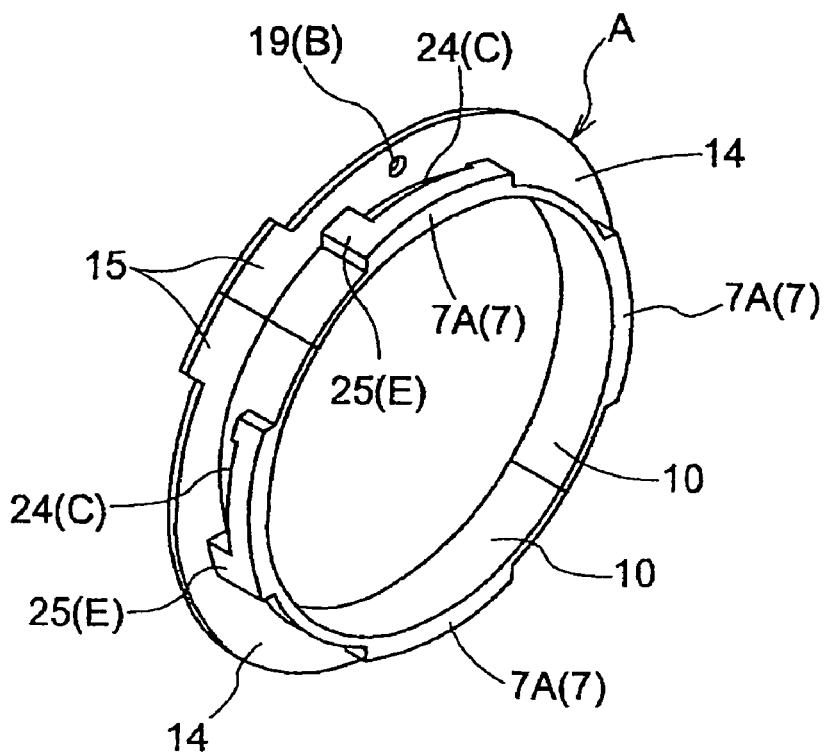
[FIG. 13] Perspective view of the control members and the flange portions forming the attachment/detachment control device.
Figure 14:
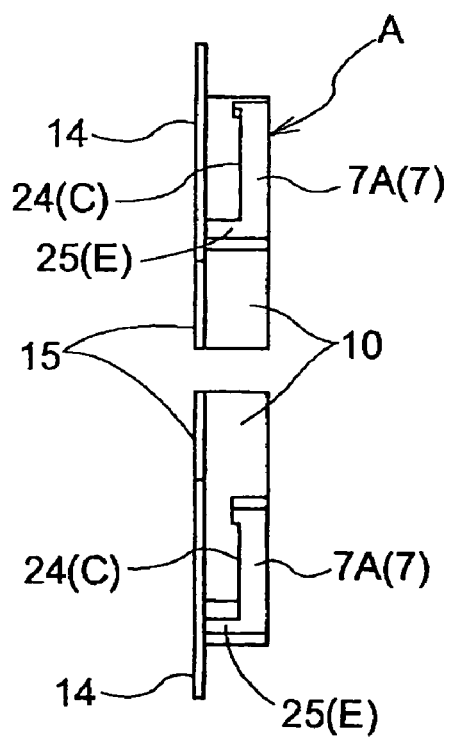
[FIG. 14] Side view of the control members and the flange portions forming the attachment/detachment control device.

As shown in FIGS. 1 and 4, the fixing device B includes a through bore 19 formed in the flange portion 14 of each control member 10 at a portion corresponding to a circumferentially middle position of one of the split lock pieces 7A for receiving a fixing bolt 18 with a slight allowance. A threaded bore 20 is formed in the receiving opening end portion 1b of the receiving pipe section 1 for receiving the fixing bolt 18 at a portion corresponding to a circumferentially middle portion of one of the retainer wall portions 12 facing the one split lock piece 7A of each control member 10.

As the split lock pieces 7A are inserted through the attachment/detachment recesses 11 of the receiving pipe section 1 and rotated about the direction of pipe axis X to the predetermined attachment position, the through bores 19 formed in the flange portions 14 of the control members 10 are brought into register with the threaded bores 20 formed in the retainer wall portions 12, which allows the control members 10 to be fastened and fixed to the receiving pipe section 1 through the fixing bolts 18, with the split lock pieces 7A in the predetermined attachment position.

Engaging stopper projections 16 are formed integrally with the outer circumferential surface 2a of the inserted pipe section 2 for attaching an attachment/detachment operating jig thereto that fits and separates the two pipe sections 1 and 2 in the direction of pipe axis X. A flange-shaped attaching portion 31 is formed in the end portion of the outer circumferential surface of the receiving pipe section 1 to correspond to a rubber tubular cover 17 mounted to extend over the outer circumferential surfaces of the receiving pipe section and the inserted pipe section 2 in tight contact condition for covering the annular space S and the outward surfaces of the attachment/detachment recesses 11.

In disassembling the two pipe sections 1 and 2, the fixing bolt 18 fastening and fixing each control, member 10 to the receiving pipe section 1 is removed, and then the control pinching portions 15 formed at the circumferentially opposite ends of the flange portion 14 of each control member 10 are held to rotate each control member 10 about the direction of pipe axis X along the rotating operation guide groove 13 so that the split lock pieces 7A of each control member 10 may face, in the direction of pipe axis X, the attachment/detachment recesses 11 formed in the receiving opening end portion 1b of the receiving pipe section 1. Each control member 10 is moved in the direction of pipe axis X in the attachment/detachment operating position where the split lock pieces 7A correspond to the attachment/detachment recesses 11, thereby to remove each control member 10 having the split lock pieces 7A from the receiving pipe section 1. Subsequently, the two pipe sections 1 and 2 may only be separated in the direction of pipe axis X using the attachment/detachment jig or the like.

In connecting the two pipe sections 1 and 2, the receiving pipe section 1 and inserted pipe section 2 are fitted and connected to each other in the direction of pipe axis X by using the attachment/detachment operation jig or the like. Then, the control pinching portions 15 formed at the circumferentially opposite ends of the flange portion 14 of each control member 10 are held to insert the engaging pieces 7A of each control member 10 into the rotating operation guide groove 13 of the receiving pipe section 1 through the attachment/detachment recesses 11 formed in the receiving opening end portion 1b of the receiving pipe section 1. The split lock pieces 7A of each control member 10 are rotated to the predetermined attachment position along the rotating operation passage of the rotating operation guide groove 13.

As the split lock pieces 7A of each control member 10 are rotated to the predetermined attachment position, the through bore 19 formed in the flange portion 14 of each control member 10 is brought into register with the threaded bore 20 formed in the retainer wall portion 12, thereby to fasten and fix the control member 10 to the receiving pipe section 1 through the fixing bolt 18, with the split lock pieces 7A in the predetermined attachment position.

In this state, when an external force is applied to the two pipe sections 1 and 2 in a pulling direction due to an earthquake or uneven settlement, for example, the engaging projection 5 protruding from the outer circumferential surface of the inserted pipe section 2 collides with the split lock pieces 7A of each control member 10 in the direction of pipe axis X. However, the shock applied to each split lock piece 7A is reliably received as it is by the retainer wall portion 12 of the receiving pipe section 1, thereby to firmly prevent separation of the two pipe sections 1 and 2.

Thus, while a desired separation preventive function is reliably performed by contact between each of the split lock pieces 7A on the receiving pipe section 1 and the engaging projection 5 on the inserted pipe section 2, the two pipe sections 1 and 2 can be assembled and disassembled readily and efficiently with reduced labor.

Second Embodiment

FIGS. 10(a) and 10(b) show an improvement on the pipe joint construction described in the above first embodiment, in which a return preventive device C is provided for receiving the split lock pieces 7A at the removing side (outwardly) in the direction of pipe axis X, i.e. in a position advancing on the outer surface of each retainer wall portion 12, when the split lock pieces 7A of each control member 10 inserted into the receiving pipe section 1 are rotated along the rotating operation passage of the rotating operation guide grooves 13, and for preventing or restraining, in the receiving position, a relative rotation of the split lock pieces 7A toward the attachment/detachment operating position. Further, an urging device is provided for urging the control member 10 having the split lock pieces 7A to the receiving position of the return preventive device C (reference sign D in FIG. 1).

The return preventive device C includes an engaging projection 22 formed on a circumferentially middle portion of one side face of each split lock piece 7A adjacent the retainer wall portion 12 to protrude therefrom, and an engaged recess 23 formed in the retainer wall portion 12 into which (or with which) the engaging projection 22 forming part of the split lock piece 7A is relatively engageable in the direction of pipe axis X when each split lock piece 7A of the control member 10 is in the predetermined attachment position in the rotating operation passage.

The urging device D is arranged to move and urge, in the direction of pipe axis X, each split lock piece 7A of the control members 10 rotated to the retaining control position in the rotating operation passage so as to allow the engaging projection 22 of the lock piece to be engaged with the engaged recess 23 of the retainer wall portion 12 by utilizing an elastic restoring force of the elastic seal member 4 compressed between the inner circumferential surface 1a of the receiving pipe section 1 and the outer circumferential surface 2a of the inserted pipe section 2.

As each split lock piece 7A of the control members 10 is rotated to the predetermined attachment position along the rotating operation passage in the rotating operation guide groove 13, the engaging projection 22 is engaged with the engaged recess 23 in the return preventive member C formed between the opposed surfaces of each split lock piece 7A and retainer wall portion 12 by the elastic restoring force of the elastic seal member 4, thereby to urge and maintain each split lock piece 7A in the receiving position. Thus, it is possible to restrain each split lock piece 7A of the control members 10 in the receiving position from moving toward the rotating operation passage even if an external force is applied. As a result, a desired removal preventive function can be constantly and reliably performed by contact between the split lock pieces 7A on the receiving pipe section 1 and the engaging projection 5 on the inserted pipe section 2.

Since the other aspects of the construction are the same as those described in the first embodiment, like reference numerals are affixed to like components, and are not described.

Third Embodiment

FIGS. 11 through 14 show an improvement on the pipe joint construction described in the above first embodiment, in which a return preventive device C is provided for receiving the split lock pieces 7A at the removing side (outwardly) in the direction of pipe axis X, i.e. in the position advancing on the outer surface of each retainer wall portion 12, when the split lock pieces 7A of each control member 10 inserted into the receiving pipe section 1 are rotated along the rotating operation passage of the rotating operation guide grooves 13, and for preventing or restraining, in the receiving position, a relative rotation of the split lock pieces 7A toward the attachment/detachment operating position. An urging device D is also provided for moving and urging the control member 10 having the split lock pieces 7A to the receiving position of the return preventive members C. Further, a rotation limiting device E is provided for preventing a further rotating operation of the lock pieces 7A to maintain the split lock pieces 7A in the predetermined attachment position when the split lock pieces 7A of each control member 10 inserted into the attachment/detachment operating position through the attachment/detachment recesses 11 of the receiving pipe section 1 are rotated along the rotating operation passage in the rotating operation guide groove 13.

In forming the return preventive device C, each lock piece 7A of the control members 10 has a circumferential width larger than a circumferential width of each retainer wall portion 12 of the receiving pipe section 1. The return preventive device C includes an engaged recess 24 formed in a circumferentially middle portion of one side face of each split lock piece 7A adjacent the retainer wall portion 12 into which (or with which) part of the retainer wall portion 12 is relatively engageable in the direction of pipe axis X when each split lock piece 7A of the control members 10 is in the predetermined attachment position in the rotating operation passage.

The urging device D is arranged to move and urge, in the direction of pipe axis X, each split lock piece 7A of the control members 10 rotated to the retaining control position in the rotating operation passage so as to allow the engaging projection 25(E) of the lock piece to be engaged with the engaged recess 24(C) of the retainer wall portion 12 by utilizing the elastic restoring force of the elastic seal member 4 compressed between the inner circumferential surface 1a of the receiving pipe section 1 and the outer circumferential surface 2a of the inserted pipe section 2.

The rotation limiting device E includes a stopper piece 25 formed integrally with each control members 10 and extending from one circumferential end portion of each split lock piece 7A to flange portion 14 for contacting one circumferential end face of each retainer wall portion 12 of the receiving pipe section 1 when the split lock piece 7A of each control member 10 is rotated to the retaining control position along the rotating operation passage in the rotating operation guide groove 13.

As each split lock piece 7A of the control members 10 is rotated to the predetermined attachment position along the rotating operation passage in the rotating operation guide groove 13, the stopper piece 25 contacts the circumferential end face of each retainer wall portion 12 to prevent further rotation. At the same time, each split lock piece 7A is moved in the direction of pipe axis X by the elastic restoring force of the elastic seal member 4 whereby the engaged recess 24 of the return preventive device C formed in the lock piece is engaged with the retainer wall portion 12 to urge and maintain each split lock piece 7A in the receiving position. Thus, it is possible to restrain each split lock piece 7A of the control members 10 in the receiving position from moving toward the rotating operation passage even if an external force is applied. As a result, a desired removal preventive function can be constantly and reliably performed by contact between the split lock pieces 7A in the receiving pipe section 1 and the engaging projection 5 in the inserted pipe section 2.

Since the other aspects of the construction are the same as those described in the first embodiment, like reference numerals are affixed to like components, and are not described.

Fourth Embodiment

Figure 15:
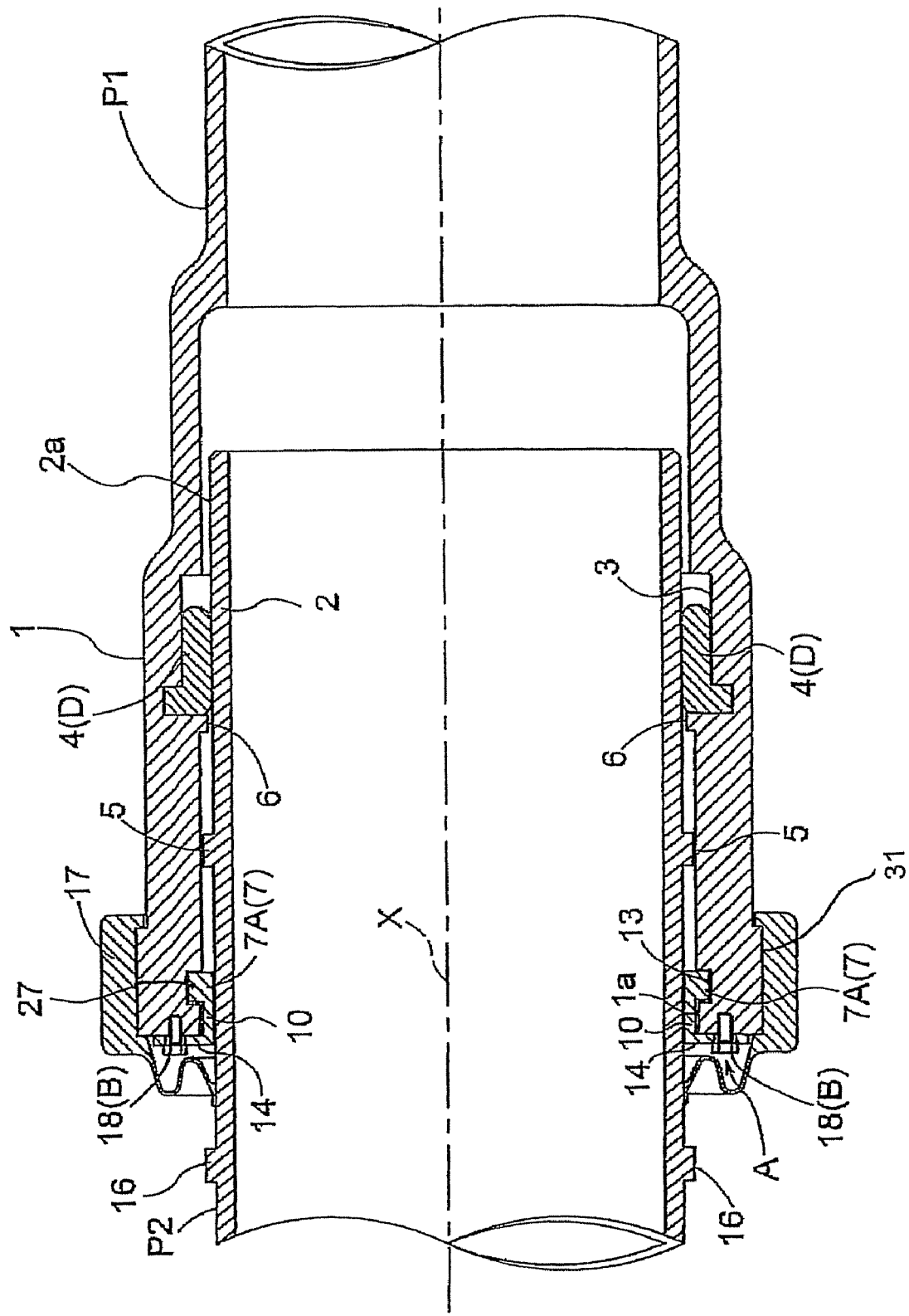
[FIG. 15] Sectional side view of a pipe joint construction according to a fourth embodiment of the present invention.

Each of the above embodiments has been described in relation to the pipe joint construction in which the receiving pipe section 1 and inserted pipe section 2 are connected to each other to be incapable of extension and contraction. As shown in FIG. 15, the technique of the present invention may be applied to a pipe joint construction in which a distance between each split lock piece 7A of the control members 10 and each stopper wall portion 6 on the inner circumferential surface 1a of the receiving pipe section 1 defines a length corresponding to a predetermined extending and contracting allowance in the direction of pipe axis X.

Since the other aspects of the construction are the same as those described in the first embodiment, like reference numerals are affixed to like components, and are not described.

Fifth Embodiment

Figure 16:
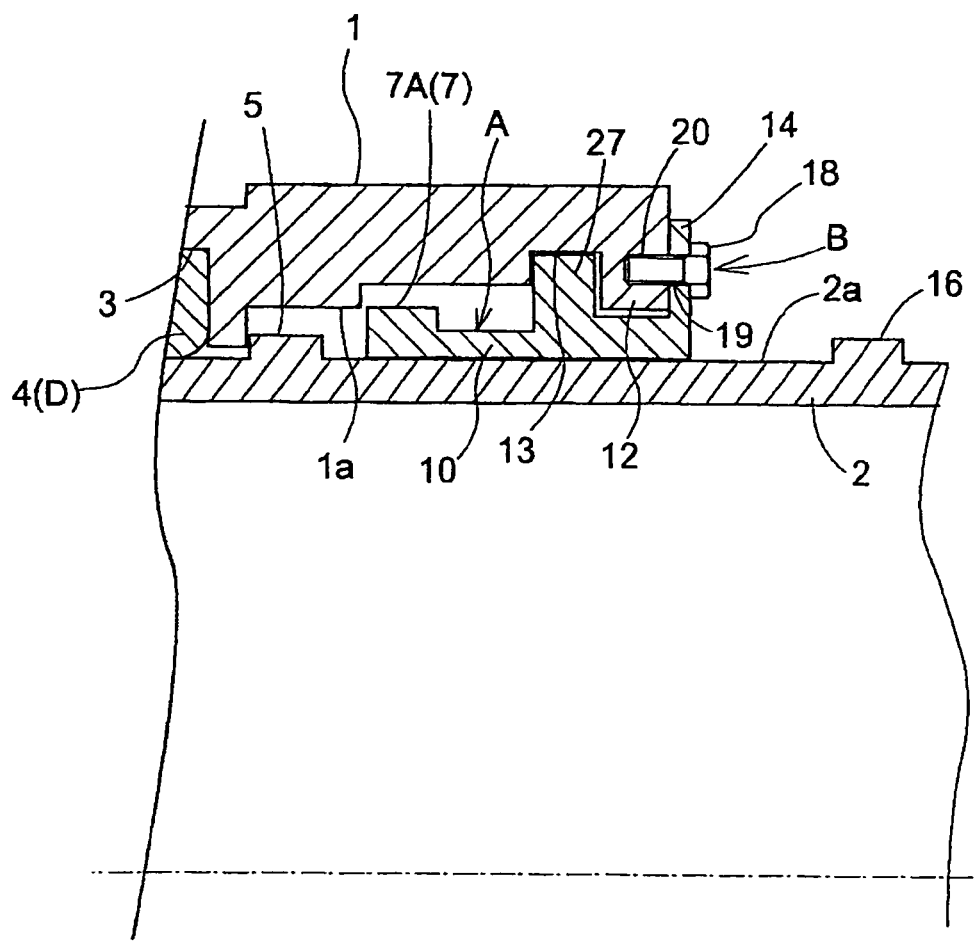
[FIG. 16] Enlarged sectional side view of a principal portion of a pipe joint construction according to a fifth embodiment of the present invention.
Figure 17:
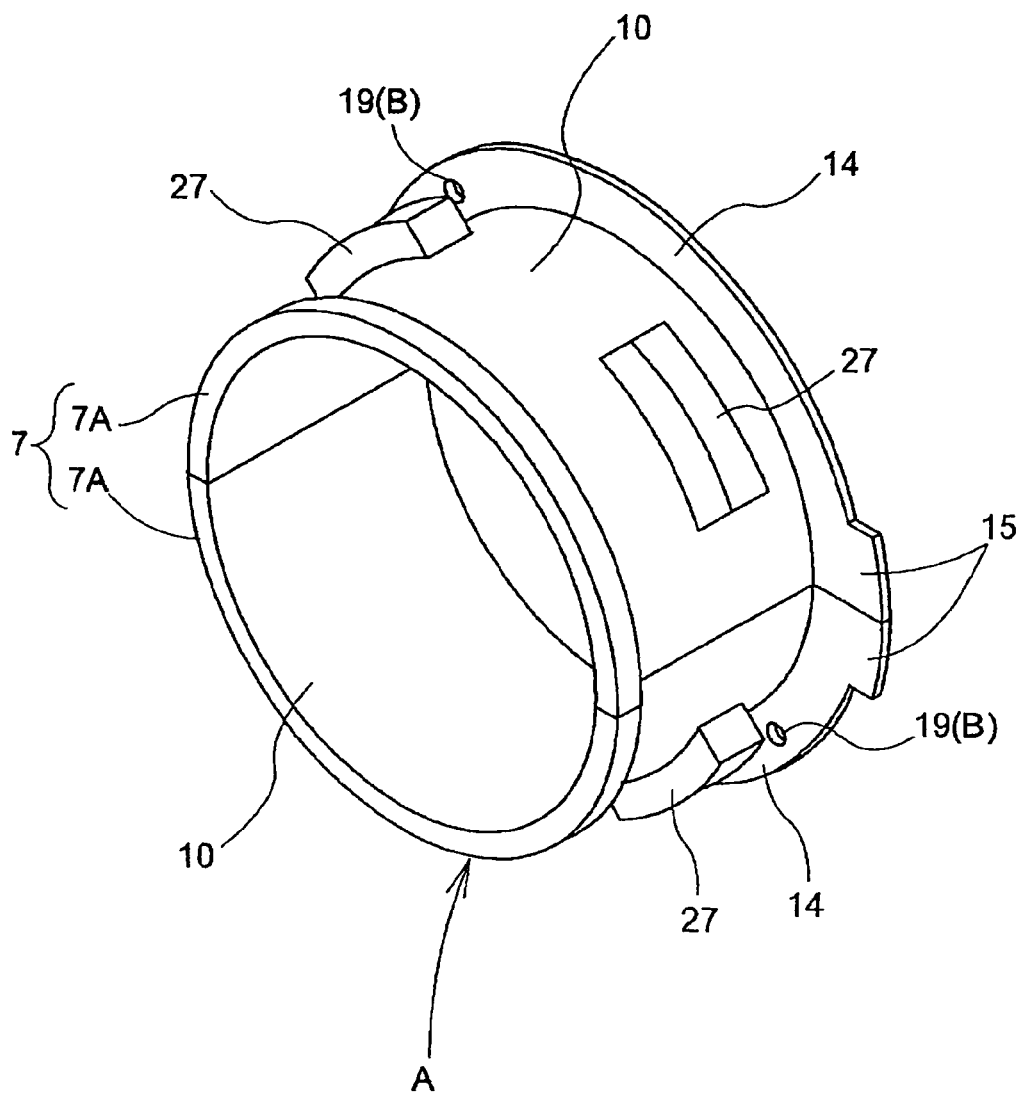
[FIG. 17] Perspective view of the control members and the flange portions forming the attachment/detachment control device.
Figure 18:
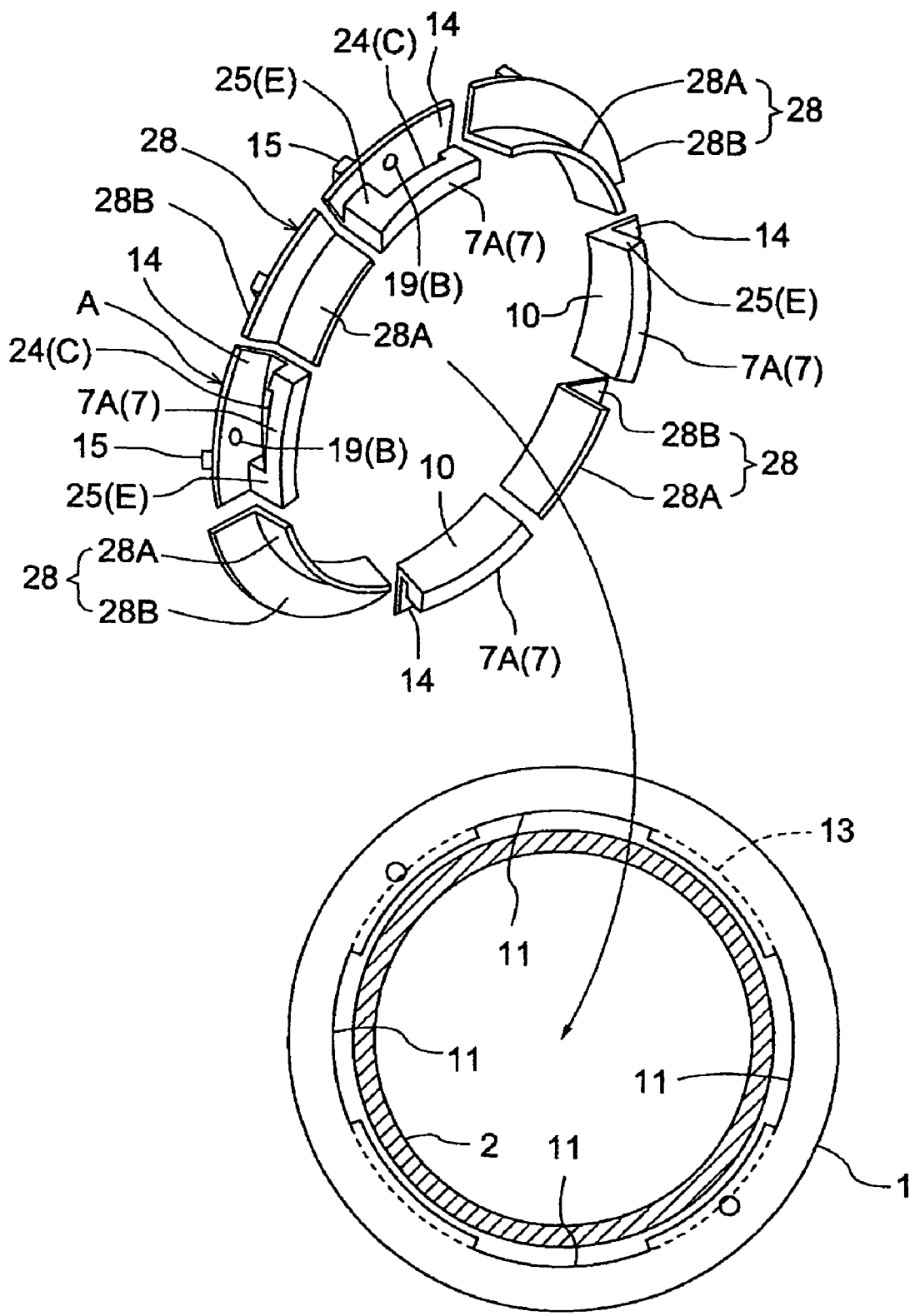
[FIG. 18] Partly sectional view of a pipe joint construction according to a sixth embodiment of the present invention before pipe sections are fitted and connected to each other.
Figure 19:
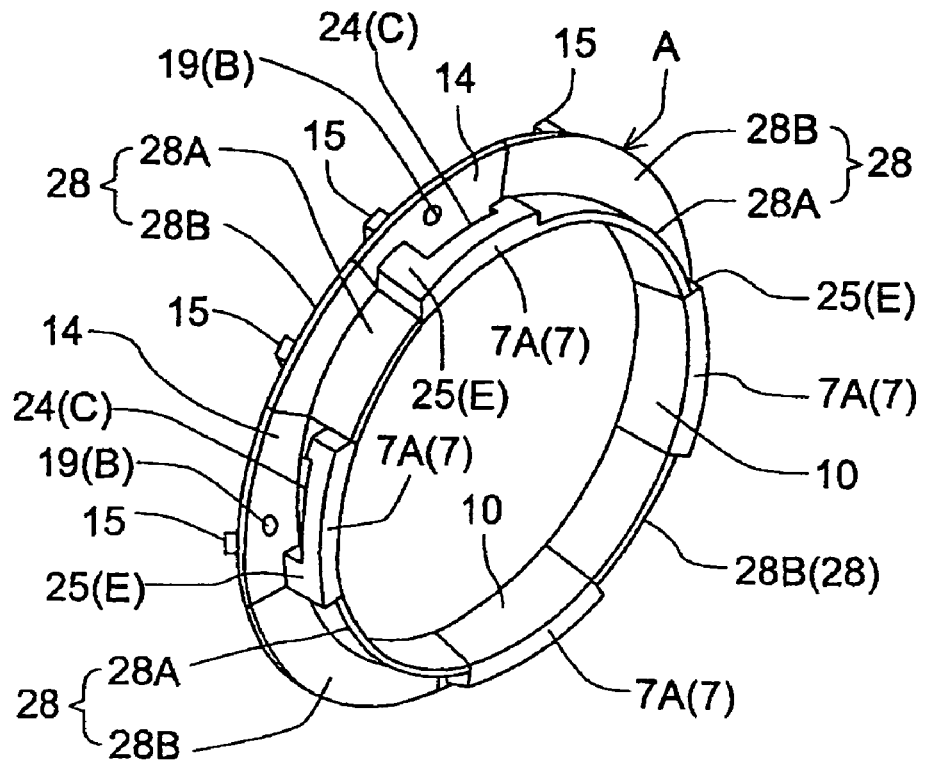
[FIG. 19] Perspective view of the control members and the flange portions forming the attachment/detachment control device.
Figure 20:
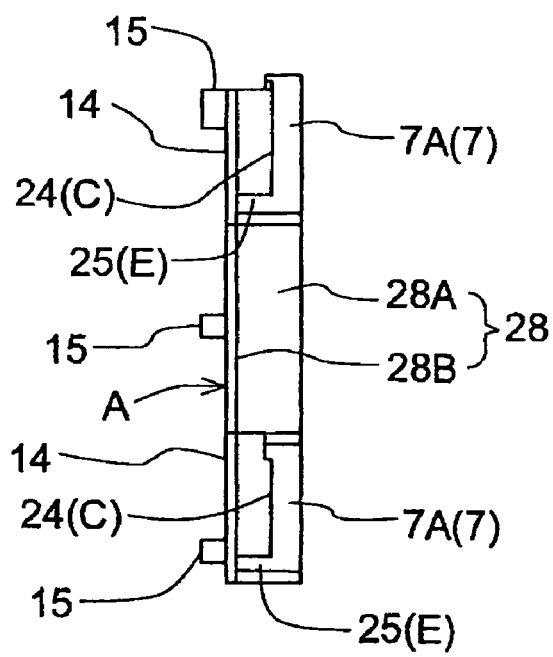
[FIG. 20] Side view of the control members and the flange portions forming the attachment/detachment control device.
Figure 21:
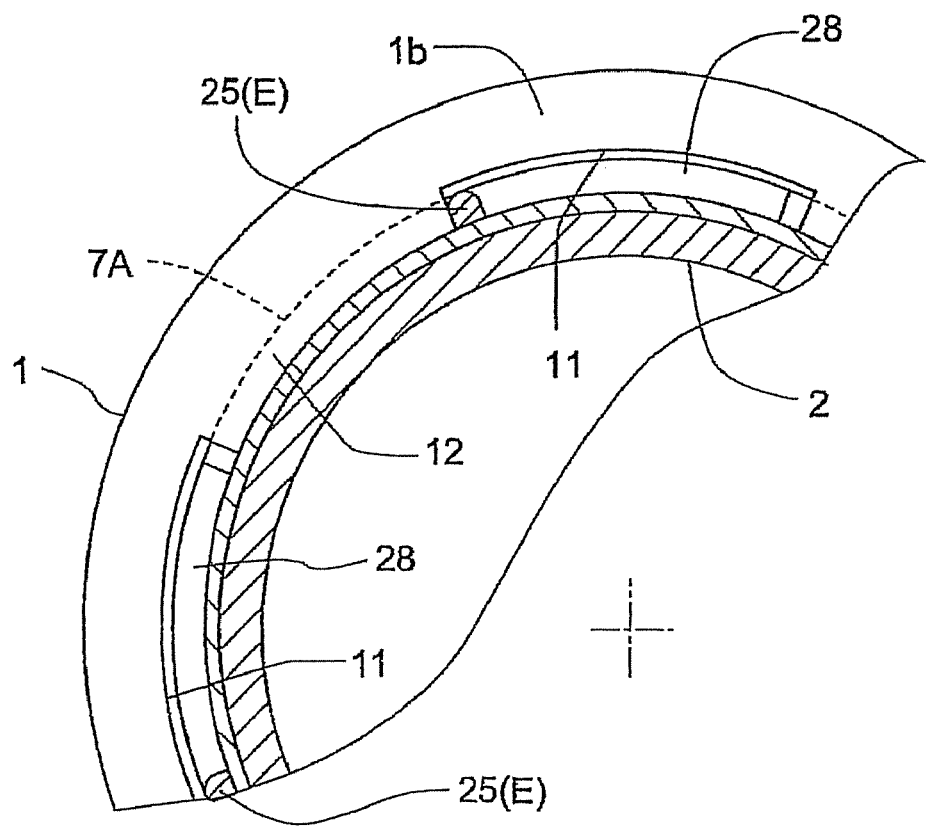
[FIG. 21] Enlarged sectional front view of the principal portion of the construction in which the split lock pieces are placed in the predetermined attachment position.

FIGS. 16 and 17 show an improvement on the pipe joint construction described in each of the above embodiments, in which the attachment/detachment control device A includes the control members 10 in the form of a pair of semicylindrical elements insertable and removable in the direction of pipe axis X through the space between the outer circumferential surface 2a of the inserted pipe section 2 and the inner circumferential surface 1a of the receiving pipe section 1, and capable of fitting along the outer circumferential surface 2a of the inserted pipe section 2. The control members 10 have a predetermined number of (one for each control member in this embodiment) semicircular split lock pieces 7A formed at the forward end portions of the control members to constitute the lock member 7. Each control member 10 includes engaging pieces 27, larger than the receiving opening inner diameter 1a of the receiving pipe section 1, and formed integrally with the outer circumferential surface in two circumferential positions intermediate in the direction of pipe axis X. The receiving pipe section 1 includes attachment/detachment recesses 11 formed in the open end portion thereof for allowing the engaging pieces 27 to be inserted and removed in the direction of pipe axis X, and retainer wall portions 12 for contacting the engaging pieces 27 in the direction of pipe axis X thereby to prevent disengaging movement thereof when the engaging pieces 27 inserted through the attachment/detachment recesses 11 are rotated about the direction of pipe axis X to the predetermined attachment position. That is, in this embodiment, the engaging pieces 27 are formed on the outer circumferential surface of each control member 10 in positions different from the split lock pieces 7A.

A rotating operation guide groove 13 is formed in the inner circumferential surface 1a of the receiving opening of the receiving pipe section 1 larger than the outer diameter of the split lock pieces 7A of the control members 10, for receiving the engaging pieces 27 of the control members 10 to guide rotational movement of the control members 10 about the direction of pipe axis X. The rotational operation guide groove 13 communicates in four circumferential positions thereof with the attachment/detachment recesses 11 in the direction of pipe axis X.

In disassembling the two pipe sections 1 and 2, the fixing bolt 18 fastening and fixing each control member 10 to the receiving pipe section 1 is removed, and then the control pinching portions 15 formed at the circumferentially opposite ends of the flange portion 14 of each control member 10 are held to rotate each control member 10 about the direction of pipe axis X along the rotating operation guide groove 13 so that the engaging pieces 27 of each control member 10 may face, in the direction of pipe axis X, the attachment/detachment recesses 11 formed in the receiving opening end portion 1b of the receiving pipe section 1. Each control member 10 is moved in the direction of pipe axis X in the attachment/detachment operating position where the engaging pieces 27 correspond to the attachment/detachment recesses 11, thereby to remove each control member 10 having the engaging pieces 27 from the receiving pipe section 1. Subsequently, the two pipe sections 1 and 2 may only be separated in the direction of pipe axis X using the attachment/detachment jig or the like.

In connecting the two pipe sections 1 and 2, the receiving pipe section 1 and inserted pipe section 2 are fitted and connected to each other in the direction of pipe axis X by using the attachment/detachment operation jig or the like. Then, the control pinching portions 15 formed at the circumferentially opposite ends of the flange portion 14 of each control member 10 are held to insert the engaging pieces 27 of each control member 10 into the rotating operation guide groove 13 of the receiving pipe section 1 through the attachment/detachment recesses 11 formed in the receiving opening end portion 1b of the receiving pipe section 1. The engaging pieces 27 of each control member 10 are rotated to the predetermined attachment position along the rotating operation passage of the rotating operation guide groove 13.

As the engaging pieces 27 of each control member 10 are rotated to the predetermined attachment position, the through bore 19 formed in the flange portion 14 of each control member 10 is brought into register with the threaded bore 20 formed in the retainer wall portion 12, thereby to fasten and fix the control member 10 to the receiving pipe section 1 through the fixing bolt 18, with the split lock pieces 7A in the predetermined attachment position.

In this state, when an external force is exerted on both the pipe sections 1 and 2 in a pulling direction due to an earthquake or uneven settlement, for example, the engaging projection 5 protruding from the outer circumferential surface of the inserted pipe section 2 collides with the split lock pieces 7A of each control member 10 from the direction of pipe axis X. However, the shock applied to each split lock piece 7A is reliably received through the engaging pieces 27 by the retainer wall portion 12 of the receiving pipe section 1 as it is, thereby to firmly prevent both the pipe sections 1 and 2 from being separated from each other.

Since the other aspects of the construction are the same as those described in the first embodiment, like reference numerals are affixed to like components, and are not described.

Sixth Embodiment

FIGS. 18 through 21 show a sixth embodiment which is a modified example of the pipe joint construction described in the above third embodiment, in which control members 10 constituting the attachment/detachment control device A and split lock pieces 7A constituting the lock member 7 each have a circumferential width capable of passing through the attachment/detachment recesses 11 of the receiving pipe section 1 in the direction of pipe axis X. Space limiting members 28 made of a synthetic resin are detachably disposed between the adjacent control members 10 inserted into the receiving pipe section 1 through the attachment/detachment recesses 11. Each space regulating member has a circumferential width to pass through the attachment/detachment recess 11 of the receiving pipe section 1 in the direction of pipe axis X.

A return preventive device C is provided for receiving the split lock pieces 7A at the removing side (outwardly) in the direction of pipe axis X, i.e. in a position advancing on the outer surface of each retainer wall portion 12, when the split lock pieces 7A of the control members 10 inserted into the receiving pipe section 1 are rotated along the rotating operation passage of the rotating operation guide grooves 13, and for preventing or restraining, in the receiving position, a relative rotation of the split lock pieces 7A toward the attachment/detachment operating position. An urging device D is also provided for urging the control members 10 having the split lock pieces 7A to the receiving position of the return preventive device C. Further, a rotation limiting device E is provided for preventing a further rotating operation of the lock pieces to maintain the split lock pieces 7A in a predetermined attachment position when the split lock pieces 7A of the control members 10 inserted into the attachment/detachment operating position through the attachment/detachment recesses 11 of the receiving pipe section 1 are rotated along the rotating operation passage in the rotating operation guide groove 13.

In forming the return preventive device C, the split lock pieces 7A of the control members 10 have a circumferential width larger than a circumferential width of the retainer wall portions 12 of the receiving pipe section 1. The return preventive device C includes an engaged recess 24 formed in a circumferentially middle portion of one side face of each split lock piece 7A adjacent the retainer wall portion 12 into which (or with which) part of the retainer wall portion 12 is relatively engageable in the direction of pipe axis X when each split lock piece 7A of the control members 10 is in the predetermined attachment position in the rotating operation passage.

The urging device D is arranged to move and urge, in the direction of pipe axis X, each split lock piece 7A of the control members 10 rotated to the retaining control position in the rotating operation passage so as to allow the engaging projection 25(E) of the lock piece to be engaged with the engaged recess 24(C) of the retainer wall portion 12 by utilizing the elastic restoring force of the elastic seal member 4 compressed between the inner circumferential surface 1a of the receiving pipe section 1 and the outer circumferential surface 2a of the inserted pipe section 2.

The rotation limiting device E includes a stopper piece 25 formed integrally with each control members 10 and extending from one circumferential end portion of each split lock piece 7A to flange portion 14 for contacting one circumferential end face of each retainer wall portion 12 of the receiving pipe section 1 when the split lock piece 7A of each control member 10 is rotated to the retaining control position along the rotating operation passage in the rotating operation guide groove 13.

The space limiting members 28 each include a limiting cylindrical piece 28A and a partly annular flange piece 28B. The limiting cylindrical piece 28A is insertable and removable in the direction of pipe axis X through a space between the outer circumferential surface 2a of the inserted pipe section 2 and the inner circumferential surface 1a of the receiving pipe section 1 and is capable of being fitted along the outer circumferential surface 2a of the inserted pipe section 2. The flange piece 28B is formed integrally with an outward end portion in the direction of pipe axis X of the outer circumferential surface of the limiting cylindrical piece 28A.

Control pinching portions 15 are formed to project from the outward surface of the flange portion 14 of each control member, and from the outward surface of the flange piece 28B of each space limiting member 28, respectively.

Since the other aspects of the construction are the same as those described in the first embodiment, like reference numerals are affixed to like components, and are not described.

Seventh Embodiment

Figure 22:
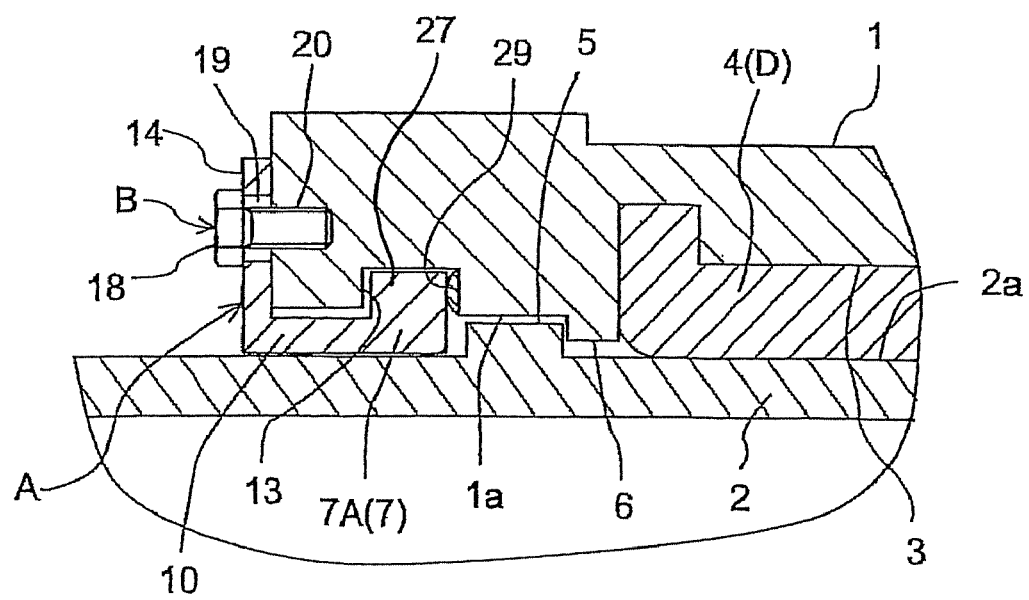
[FIG. 22] Enlarged sectional side view of a principal portion of a pipe joint construction according to a seventh embodiment of the present invention.
Figure 25:
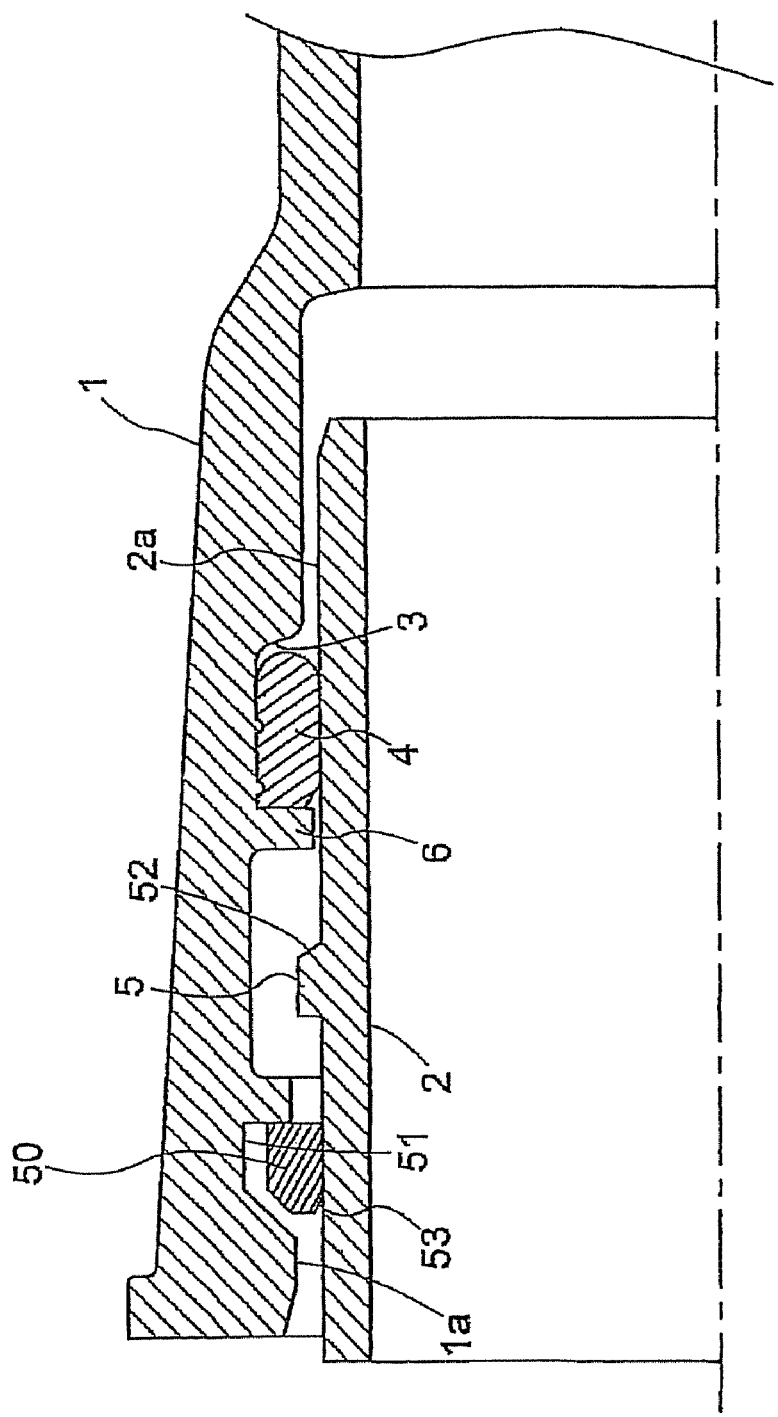
[FIG. 25] Enlarged sectional side view of a principal portion of a conventional pipe joint construction.

FIGS. 22 and 23 show an improvement on the pipe joint construction described in each of the above embodiments, in which an urging device D includes elastic urging elements 29 made of synthetic rubber or the like and provided on a guide wall surface 13a facing the rotating operation guide groove 13 for contacting the forward end surfaces of the split lock pieces 7A of the control members 10 inserted through the attachment/detachment recesses 11 in the direction of pipe axis X and for guiding rotating operation of the lock pieces about the direction of pipe axis X, at portions opposed to engaged recesses 26 formed in the retainer wall portion 12 to be engageable with the split lock pieces 7A. Each of the elastic urging elements is elastically compressed by contacting the split lock piece 7A rotated from the attachment/detachment operating position to the predetermined attachment position in the rotating operation passage. The split lock pieces 7A of the control members 10 rotated to the predetermined attachment position in the rotating operation passage are moved and urged toward the receiving position of the engaged recesses 26 by an elastic restoring force of the elastic urging elements 29 and by an elastic restoring force of the elastic seal member 4 compressed between the inner circumferential surface 1a of the receiving pipe section 1 and the outer circumferential surface 2a of the inserted pipe section 2.

Since the other aspects of the construction are the same as those described in the first embodiment, like reference numerals are affixed to like components, and are not described.

Eighth Embodiment

FIG. 24 shows an improvement on the pipe joint construction described in each of the above embodiments, in which an urging member D includes elastic urging elements 30 made of synthetic rubber or the like and provided on forward end surfaces of the split lock pieces 7A of the control members 10. Each elastic urging element is elastically compressed when the forward end surface of the split lock piece 7A inserted through the attachment/detachment recess 11 of the receiving pipe section 1 is in pressure contact with the guide wall surface 13a facing the rotating operation guide groove 13. The split lock pieces 7A of the control members 10 rotated to the predetermined attachment position in the rotating operation passage are moved and urged toward the receiving position of the engaged recesses 26 by an elastic restoring force of the elastic urging elements 30 and by an elastic restoring force of the elastic seal member 4 compressed between the inner circumferential surface 1a of the receiving pipe section 1 and the outer circumferential surface 2a of the inserted pipe section 2.

Since the other aspects of the construction are the same as those described in the first embodiment, like reference numerals are affixed to like components, and are not described.

Other Embodiments (1) In the above embodiments, the lock member 7 provided in the receiving opening side of the inner circumferential surface 1a of the receiving pipe section 1 for contacting the other side face of the engaging projection 5 of the inserted pipe section 2 is circumferentially divided into the plurality of split lock pieces 7A. Instead, the lock member 7 may be annular when it is capable of fitting on the inserted pipe section 2 in the direction of pipe axis X.

(2) In the above embodiments, the control members 10 of the attachment/detachment control device A for detachably attaching the lock member 7 to the pipe receiving portion 2 are circumferentially divided. Instead, a cylindrical control member 10 may be provided when it is capable of fitting on the inserted pipe section 2 in the direction of pipe axis X.

(3) The attachment/detachment control device A may have any construction as long as the lock member 7 can be attached to and detached from the receiving pipe section 2 by rotating operation of the lock member 7 about the direction of pipe axis X and by moving operation of the lock member in the direction of pipe axis X in the specific position (attachment/detachment operating position) of the rotating operation passage.

(4) The fixing device B may employ any fixing method as long as the lock member 7 placed in the predetermined attachment position can be detachably fixed to the receiving pipe section 1.

INDUSTRIAL UTILITY

According to the pipe joint construction of the present invention, while a desired separation preventive function can be reliably performed by contact between the lock member provided in the receiving pipe section and the engaging projection provided in the inserted pipe section, the assembly and disassembly of those pipe sections can be efficiently and readily made with reduced labor. This construction may be applied not only to the pipeline system of water pipes as shown in the above embodiments, but also to a pipeline system of various types of fluid pipes for supplying liquid or gas.

DESCRIPTION OF THE REFERENCE SIGNS

A attachment/detachment control device
B fixing device
C return preventive device
D urging device
S annular space
X pipe axis
1 receiving pipe section
1a inner circumferential surface
2 inserted pipe section
2a outer circumferential surface
3 mounting groove
4 elastic seal member
5 engaging projection
6 stopper wall portion
7 lock member
7A split lock pieces
10 control members
11 attachment/detachment recesses
12 retainer wall portions
14 flange portions
15 control pinching portions
23 engaged recesses
24 engaged recesses
26 engaged recesses
27 engaging pieces
28 space limiting members

The invention claimed is:

1. A pipe joint construction comprising an elastic seal member for hermetically sealing between an inner circumferential surface of a receiving pipe section and an outer circumferential surface of an inserted pipe section inserted into and connected to the receiving pipe section in a pipe axis direction, and a lock member provided interior to the inner circumferential surface of the receiving pipe section adjacent a receiving opening thereof for preventing separating movement of the pipe sections by contacting an engaging projection protruding from the outer circumferential surface of the inserted pipe section in the pipe axis direction, wherein the construction further comprises an attachment/detachment control device for attaching and detaching the lock member to/from the receiving pipe section by rotating the lock member about the pipe axis direction relative to a rotating operation passage of a rotating operation guide groove formed in an inner circumferential surface of the receiving opening of the receiving pipe section and by moving, in the pipe axis direction, the lock member placed in a specific attachment/detachment operating position in a passage of rotation, the attachment/detachment control device includes a plurality of circumferentially divided control members insertable and removable in the pipe axis direction through a space between the outer circumferential surface of the inserted pipe section and the inner circumferential surface of the receiving pipe section, and a plurality of circumferentially extending split lock pieces forming the lock member and dispersedly formed on the control members, and the receiving pipe section includes, formed adjacent a receiving opening end thereof, attachment/detachment recesses for allowing insertion and removal of the split lock pieces in the pipe axis direction, and retainer wall portions for contacting the split lock pieces in the pipe axis direction when the split lock pieces inserted through the attachment/detachment recesses are rotated about the pipe axis direction to a predetermined attachment position thereby to prevent disengaging movement of the lock pieces, the pipe joint construction further comprises a return preventive device provided for receiving the split lock pieces in positions advanced on a removing side in the pipe axis direction in the rotating operation passage when the split lock pieces inserted into the receiving pipe section are rotated along the rotating operation passage, and for preventing or restraining a relative rotation of the split lock pieces in a receiving position toward the specific attachment/detachment operating position, and the pipe joint construction further comprises an elastic urging element provided between the split lock pieces and the receiving pipe section in the rotating operation passage, and provided for urging the split lock pieces to the receiving position of the return preventive device while being brought into contact with the split lock pieces and the receiving pipe section in the pipe axis direction.

2. A pipe joint construction as defined in claim 1, further comprising a stopper wall portion formed in the inner circumferential surface of the receiving pipe section at a portion close to the receiving opening from a seal mounting groove for receiving the elastic seal member to contact an engaging projection protruding from the outer circumferential surface of the inserted pipe section in the pipe axis direction, thereby to limit a maximum contracting position between the pipe sections.

3. A pipe joint construction as defined in claim 1, wherein the split lock pieces are formed on outer circumferential surfaces of the control members with engaging portions extending beyond an inner diameter of the receiving opening of the receiving pipe section.

4. A pipe joint construction as defined in claim 1, wherein the control members include flange portions formed at outward end portions thereof for closing or substantially closing an annular space between the inner circumferential surface of the receiving pipe section and the outer circumferential surface of the inserted pipe section.

5. A pipe joint construction as defined in claim 1, wherein each control member has a control pinching portion formed on an outward end portion thereof.

6. A pipe joint construction as defined in claim 1, wherein each control member comprises a pair of semicylindrical elements to be fitted along the outer circumferential surface of the inserted pipe section.

7. A pipe joint construction as defined in claim 1, wherein the control members and the split lock pieces have a circumferential width to pass through the attachment/detachment recesses in the receiving pipe section, and wherein space limiting members made of a synthetic resin to have a circumferential width to pass through the attachment/detachment recesses in the receiving pipe section in the pipe axis direction are disposed between adjacent control members inserted into the receiving pipe section through the attachment/detachment recesses.

8. A pipe joint construction as defined in claim 1, wherein the return preventive device includes recesses formed in the split lock pieces into which part of the receiving pipe section is relatively engageable in the pipe axis direction when the split lock pieces are in the predetermined attachment position of the rotating operation passage.

* * * * *

UNITED STATES PATENT AND TRADEMARK OFFICE
CERTIFICATE OF CORRECTION

PATENT NO. : 7,604,263 B2  Page 1 of 1
APPLICATION NO. : 10/582809
DATED : October 20, 2009
INVENTOR(S) : Mori et al.

It is certified that error appears in the above-identified patent and that said Letters Patent is hereby corrected as shown below:

Column 10, Lines 61-62, "projection 22" should read -- projection 25(E) --

Column 10, Line 62, "recess 23" should read -- recess 24(C) --

Signed and Sealed this

Sixteenth Day of February, 2010

David J. Kappos
*Director of the United States Patent and Trademark Office*

UNITED STATES PATENT AND TRADEMARK OFFICE
CERTIFICATE OF CORRECTION

PATENT NO. : 7,604,263 B2 Page 1 of 1
APPLICATION NO. : 10/582809
DATED : October 20, 2009
INVENTOR(S) : Mori et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 456 days.

Signed and Sealed this

Fifth Day of October, 2010

David J. Kappos
*Director of the United States Patent and Trademark Office*